(12) United States Patent
Pala et al.

(10) Patent No.: US 11,716,208 B2
(45) Date of Patent: *Aug. 1, 2023

(54) PROVISIONING SYSTEMS AND METHODS

(71) Applicant: CABLE TELEVISION LABORATORIES, INC., Louisville, CO (US)

(72) Inventors: Massimiliano Pala, Denver, CO (US); Ronald H. Ih, Los Altos, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,942

(22) Filed: Mar. 28, 2022

(65) Prior Publication Data
US 2022/0224549 A1    Jul. 14, 2022

Related U.S. Application Data

(63) Continuation of application No. 16/520,202, filed on Jul. 23, 2019, now Pat. No. 11,290,286, which is a continuation-in-part of application No. 16/145,172, filed on Sep. 28, 2018, now Pat. No. 11,025,408.

(60) Provisional application No. 62/711,951, filed on Jul. 30, 2018, provisional application No. 62/702,102, filed on Jul. 23, 2018, provisional application No. 62/575,782, filed on Oct. 23, 2017, provisional application No. 62/575,082, filed on Oct. 20, 2017, provisional application No. 62/563,827, filed on Sep. 27, 2017.

(51) Int. Cl.
*H04L 9/32* (2006.01)
*H04L 9/40* (2022.01)
*H04L 9/30* (2006.01)

(52) U.S. Cl.
CPC .......... *H04L 9/3268* (2013.01); *H04L 9/3073* (2013.01); *H04L 63/0876* (2013.01)

(58) Field of Classification Search
CPC .. H04L 9/3268; H04L 9/3073; H04L 63/0876
USPC ....................................................... 713/156
See application file for complete search history.

(56) References Cited

U.S. PATENT DOCUMENTS

| 5,996,076 A | 11/1999 | Rowney et al. |
| 9,736,145 B1 * | 8/2017 | Hayes ................. H04L 63/0846 |
| 11,290,286 B2 * | 3/2022 | Pala ..................... H04L 63/0876 |

(Continued)

*Primary Examiner* — Kambiz Zand
*Assistant Examiner* — Phuc Pham
(74) *Attorney, Agent, or Firm* — Josh C. Snider

(57) ABSTRACT

A method for registering and provisioning an electronic device is provided. The method includes a step of inserting a first keypair into a secure element of the electronic device. The first keypair includes a public key and a private key. The method further includes a step of requesting, from a server configured to register and provision connected devices, a provisioning of credentials of the electronic device. The method further includes a step of verifying, by the server, the electronic device credentials. The method further includes a step of registering, by the server, the electronic device. The method further includes a step of transmitting, from the server to the electronic device, a device certificate. The method further includes steps of installing the transmitted device certificate within the secure element of the electronic device, and provisioning the electronic device according to the installed device certificate.

15 Claims, 29 Drawing Sheets

(56) References Cited

U.S. PATENT DOCUMENTS

| | | |
|---|---|---|
| 2005/0210254 A1 | 9/2005 | Gabryjelski et al. |
| 2005/0287989 A1 | 12/2005 | Lee |
| 2007/0136574 A1* | 6/2007 | Oh .................. H04L 63/0442 |
| | | 713/156 |
| 2009/0103471 A1 | 4/2009 | Candelore |
| 2011/0225409 A1 | 9/2011 | Sibert et al. |
| 2012/0162537 A1 | 6/2012 | Maddali et al. |
| 2015/0121506 A1 | 4/2015 | Cavanaugh |
| 2015/0262170 A1* | 9/2015 | Bouda .................. G06Q 20/322 |
| | | 705/67 |
| 2017/0302656 A1* | 10/2017 | Ramatchandirane ........................ |
| | | H04L 63/0869 |
| 2017/0302657 A1 | 10/2017 | Moskal |

* cited by examiner

PROVISIONING SYSTEMS AND METHODS

CROSS REFERENCE TO RELATED APPLICATIONS

This application is a continuation of U.S. patent application Ser. No. 16/520,202, filed Jul. 23, 2019, which is a continuation in part of U.S. patent application Ser. No. 16/145,172, filed Sep. 28, 2018, which claims the benefit of and priority to U.S. Provisional Patent Application Ser. No. 62/563,827, filed Sep. 27, 2017, to U.S. Provisional Patent Application Ser. No. 62/575,082, filed Oct. 20, 2017, and to U.S. Provisional Patent Application Ser. No. 62/575,782, filed Oct. 23, 2017, all of which are incorporated herein by reference in their entireties. This application also claims priority to U.S. Provisional Patent Application Ser. No. 62/702,102, filed Jul. 23, 2019, and to U.S. Provisional Patent Application Ser. No. 62/711,951, filed Jul. 30, 2019, both of which are also incorporated herein by reference in their entireties.

BACKGROUND

The field of the disclosure relates generally to the management of device registration, and more particularly, to systems and methods for securely registering and provisioning electronic devices.

Conventional electronic devices interact with a number of secure electronic networks and computer systems. Although many of these networks and systems are subject to significant security protections, the electronic devices that interact therewith may not be subject to the same levels of security. Therefore, it is important to be able to reliably determine the identity of such electronic devices in order to provision the devices for use within a particular network, system, or ecosystem. Such provisioning techniques are not trivial. Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce.

At present, conventional IoT infrastructures are known to employ hardware roots of trust that aim to establish a tamper-resistant secure element, that is, a "black box," that use built-in cryptographic keys to perform cryptographic operations, such as encryption, decryption, and hashing. Examples of such hardware roots of trust include the Trusted Platform Module (TPM) and the Hardware Security Module (HSM). These trust models/schemes are used for remote attestation, with the attestation being typically performed by a third party and/or a Cloud services user. Conventional HSM infrastructures often utilize PKI.

PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

In conventional PKI ecosystems, the management of keys, as well as the process of inserting the keys into the devices or secure elements, is problematic, expensive, and difficult to audit. Some manufacturers undertake the burden to provision a secure element of an electronic device, but the requirements to provision PKI at the manufacturing level are also difficult to implement, particularly with respect to such PKI requirements as revocation, potential auditing, and the manufacturer's ability or inability to share CA keys. These difficulties increase significantly where an electronic device is manufactured using a secure element from a different manufacturer, when multiple secure elements are implemented within a single electronic device, and/or when an electronic device or its secure element are provisioned and registered in more than one ecosystem.

In particular, many conventional IoT devices may be deployed in more than one ecosystem (e.g., Open Connectivity Foundation (OCF), AllSeen/AllJoyn, Nest/Thread, Zigbee, etc.), and a different key may be inserted at the time of manufacture on a device for each ecosystem into which deployment is desired. Accordingly, it is desirable to develop a simplified provisioning and registration approach for manufacturers and for cross-manufacturer support.

At present, the manufacture of IoT device involves significant cybersecurity nuances and complexities. However, the majority of device manufacturers do not have the requisite cybersecurity experience and knowledge to fully implement secure device provisioning at the manufacturing level, which has negatively impacted the speed at which the IoT has been adopted. Where devices are manufactured for the IoT, many important security concerns have been omitted from the design process.

In the conventional manufacturing process, because each customer's certificate profile and policies are unique, the manufacturer must individually track each customer as a unique part number, even though the particular crypto authentication (e.g., ECC508A) and its derivatives may be standard products. Accordingly, implementation of secure elements within connected devices can typically result in thousands of part numbers for tracking each customer, which is not considered to be manageable in the long term. On the security infrastructure side, PKI-based authentication as been able to provide strong cryptographic techniques for establishing verifiable device identities, and also for managing these identities on an ongoing basis. However, the process of setting up a PKI requires detailed knowledge of cryptography and security methodologies, and is quite costly to implement on an individual basis.

Accordingly, there is a need for a significantly simplified and more cost-effective technique for securely provisioning electronic IoT devices and/or the secure elements provided therein. It is further desirable to simplify the provisioning process without sacrificing security features, nor requiring manufacturers to be highly sophisticated cybersecurity experts.

BRIEF SUMMARY

In an embodiment, a method for registering and provisioning an electronic device is provided. The method includes a step of inserting a first keypair into a secure element of the electronic device. The first keypair includes a public key and a private key. The method further includes a step of requesting, from a server configured to register and provision connected devices, a provisioning of credentials of the electronic device. The method further includes a step of verifying, by the server, the electronic device credentials. The method further includes a step of registering, by the server, the electronic device. The method further includes a step of transmitting, from the server to the electronic device, a device certificate. The method further includes steps of installing the transmitted device certificate within the secure element of the electronic device, and provisioning the electronic device according to the installed device certificate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
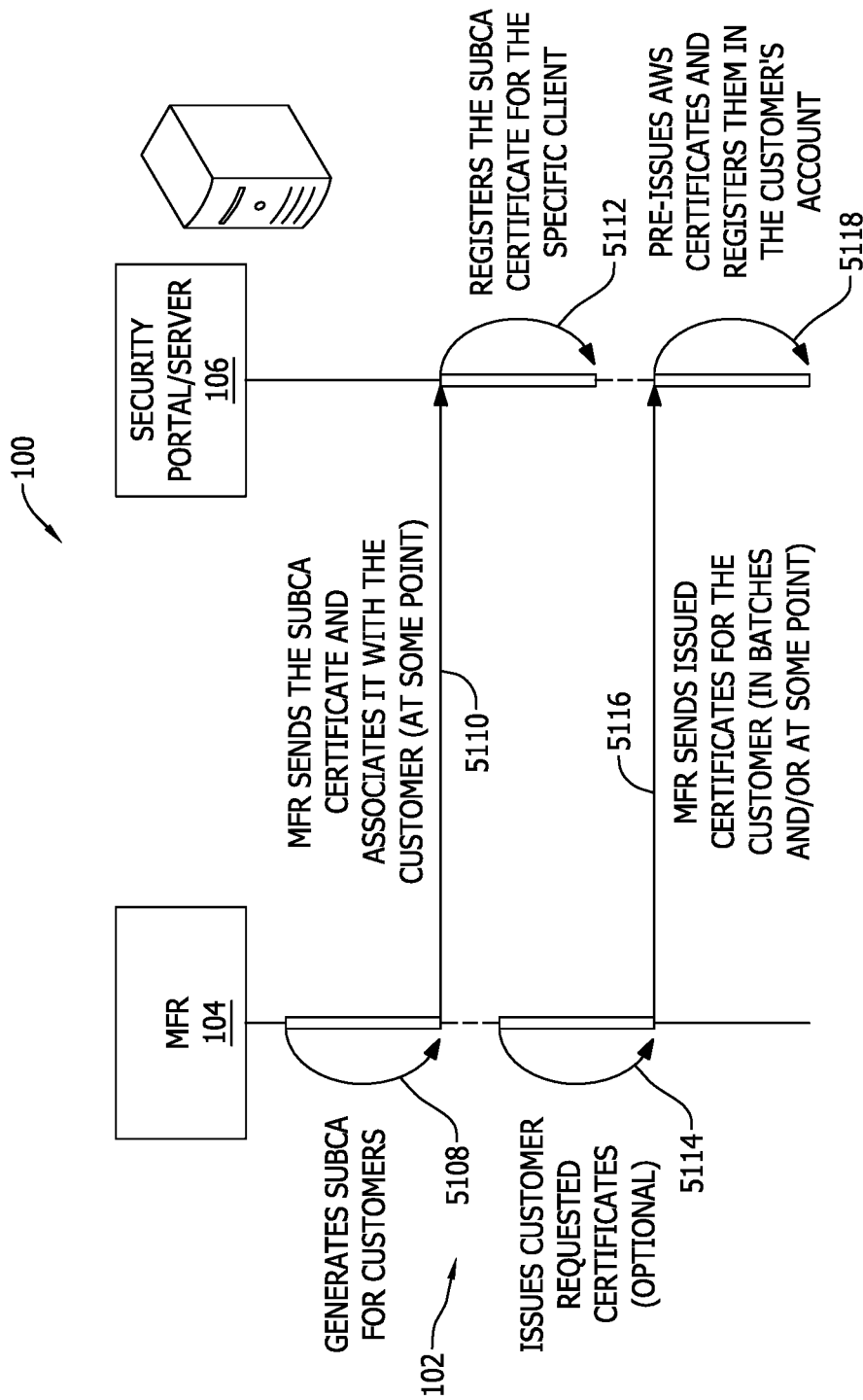
FIG. 1 is a schematic illustration of an architecture for implementing a managed PKI process, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods for pre-provisioning a secure element semiconductor during the manufacturing process (e.g., at the factory) and have new keys and certificates pushed to the secure element over the course of the entire design cycle for an IoT device application. Through the innovative techniques described herein, the broader vision of realizing a secure IoT is achieved at a level as "simple as buying a chip."

In an exemplary embodiment devices manufacturers are provided with a recognizable design paradigm, but which is packed with a PKI-based security foundation which largely manages itself with little or no involvement required by the device manufacturer. In an exemplary embodiment, a considerable portion of the cybersecurity complexity is managed in the backend systems of the security infrastructure (e.g., a security server, portal, or security portal server) which is generally more capable of addressing the nuances and complexity of the cybersecurity needs of one or many customers. The exemplary embodiment, the security infrastructure portal server is further responsible for coordinating efforts with its secure manufacturing partner(s), such as the integrated chip (IC) or microchip manufacturers of the secure elements.

Moreover, because a CA or sub-CA that is actively involved with signing credentials must also be involved with the management of those credentials. Accordingly, the solutions presented throughout the present embodiments provide a transition from an unmanaged PKI to a managed PKI.

In some embodiments, systems and methods are provided for registering the credentials of a secure element, and then provisioning the secure element with a device certificate. For ease of explanation, the present embodiments primarily describe the secure element in terms of hardware, but a person of ordinary skill in the art will understand the innovative techniques herein are applicable to innovative secure software modules as well.

In an exemplary embodiment, steps for registering a device, in preparation for provisioning, may include without limitation: (i) a secure element generates a secret, such as a public/private keypair, a symmetric key, or a passphrase; (ii) the secure element generates additional cryptographic parameters, such as a Diffie-Hellman (DH) parameter, an additional keypair, etc., which may be utilized for secure authentication and/or communication with the secure element; (iii) using a public/private keypair or cryptographic element, the secure element (or associated system) sends a public part of generated parameters (e.g., raw data, or in a signed data structure), optionally together with the list of supported cryptographic algorithms and ciphers, and a signature to a registry (e.g., utilizing a registration server); (iv) a registration server stores the data/data structure in a database; and (v) the registration server sends a confirmation token to the secure element. Upon completion of one or more of these steps, the secure element may be readied for provisioning with a device certificate once the element is deployed in a device.

In an embodiment, one or more keypairs and/or cryptographic elements are inserted to or generated by the secure element prior to provisioning of the device, such as at or before the time of device or element manufacture. For example, a device manufacturer may purchase a previously-manufactured secure element and integrate the secure element, including the associated credentials of the element, in the final design of the finished device. Subsequently, when the device is purchased (e.g., by a consumer), its packaging removed, and installed within an ecosystem network, a PKI protocol for the device may validate the keys and any associated certificates.

The following embodiments provide systems and methods that enable a secure element semiconductor to be pre-provisioned at the factory/manufacturer, and have new keys and certificates pushed to the secure element over the course of the entire design cycle for an IoT device application.

Certificate Provisioning for Ecosystems

In an exemplary embodiment, IoT deployment with managed PKI is implemented with respect to a secure and usable ecosystem environment. Several of the embodiments herein are described with respect to such ecosystems as OpenADR or Amazon Web Services (AWS), but these ecosystems are provided by way of example, and not in a limiting sense. A person of ordinary skill in the art will understand, after reading and comprehending the present disclosure and associated drawings, that the systems and methods described herein are applicable to many different ecosystem environments, whether by themselves, or utilized simultaneously by the same devices, secure elements, manufacturers, or portals/servers.

In some embodiments, ecosystem certificates are distinguishable from device certificates. That is, according to the present embodiments, an individual IoT device may be provisioned with a specific ecosystem certificate, which is also referred to herein as a bootstrap certificate. Through implementation of the bootstrap certificate, production lines may be significantly simplified to the point where secure elements installed on a device may be provisioned with generic certificates. That is, the particular device need not be customized for each individual client. A further advantage of the bootstrap certificate is that there is no requirement to follow a specific ecosystem model (e.g., AWS or OpenADR).

The present embodiments therefore represent a significant improvement over conventional approaches, where manufacturers directly provide an ecosystem certificate that is tailored for only one specific ecosystem (e.g., AWS). The intention of the conventional approach is to reduce the friction encountered when integrating with the AWS ecosystem (that is, for this example). However, this approach requires the production line of the manufacturer to also follow the required AWS mechanisms, namely, different subCAs for each customer.

The managed PKI systems and methods herein therefore represent an innovative bridge between the security infrastructure and the manufacturing infrastructure, which is dynamically flexible for future environments, but requires no significant hardware or structural changes to the existing infrastructures. That is, as explained further below in greater detail, in the case of a manufacturing-only client, the manufacturer need make no changes to its production line. Additionally, the manufacturer may continue to sign certificates in substantially the same manner as it did in the conventional, unmanaged PKI environment. On the side of the security infrastructure, no additional default services are required (i.e., no automatic additional cost), but the security infrastructure is enabled to provide managed PKI(s) paid services for a client registering its own subCA (which may engender higher costs than for a client registering as a shared client). On the client side, no changes will be seen by the implementation of the present embodiments.

Implementation for shared clients though, may be different. For example, on the side of the manufacturer, no changes need be made to the production line, but in this case, the manufacturer will register the specific subCA of the client with the security infrastructure server/portal. Optionally, the manufacturer may further register any issued certificates with the server/portal as well. Seen from the side of the security infrastructure portal, for shared clients, the portal is configured to provide a per-client development subCA, as well as integration ecosystem-specific (e.g., AWS) services for development and production of subCAs. On the client side, the client experiences new and/or improved access to (1) managed (AWS) PKI infrastructures and integration, (2) other ecosystem infrastructures through the same portal (e.g., OpenADR, WIFI2.0), and (3) premium services, such as re-provisioning, revocation, etc.

As described herein, a collaborative architecture that includes a security portal and a manufacturer enables IoT device developers to implement PKI-based security more easily and seamlessly than conventional techniques are capable of achieving. The following embodiments describe certificates and processes that may be pre-packaged into a manufacturing reference design, such that a developer is capable of progressing through all stages of device development flow while implementing strong authentication-based security, but without requiring that the developer itself have the detailed knowledge of cryptography and security implementation. From the perspective of the developer, complex and nuanced security mechanisms (e.g. PKI) may be deployed within their devices/secure elements, but with essentially no more effort than to "make implementing IoT security as simple as buying a chip."

In an exemplary embodiment, a bootstrap methodology is implemented that enables the security portal and manufacturer to create a system rendering it is possible for the manufacturer to manufacture and distribute generic parts, but while retaining the significantly enhanced security strength and capabilities of a managed PKI system. These bootstrap certificate embodiments further enable the customers of the manufacturer to specify what ecosystems are desired for the customer devices to authenticate, but without requiring more than a minimal operating knowledge of the cybersecurity principles involved.

The systems and methods described herein further enable the security portal/server to create a general purpose PKI that controls access to other PKI ecosystems (e.g. OpenADR, OCF, AWS, etc.) through certificate-based authentication. By aggregating all device customers, the overall implementation costs of PKI are greatly reduced. That is, the cost of PKI implementation is distributed among all customers more evenly, as opposed to requiring each individual customer to create its own PKI.

FIG. 1 is a schematic illustration of an architecture 100 for implementing a managed PKI process 102. In the exemplary embodiment, architecture 100 includes a manufacturing infrastructure 104 (hereinafter, manufacturer 104) and a portal and/or server 106 of a security infrastructure (hereinafter portal 106). Manufacturer 104 may, for example, represent the production line infrastructure for producing secure element (not shown in FIG. 1), such as an HSM, a TPM, a System on Chip (SoC), a microchip, or another type of trusted hardware system. For simplification of the following discussion, manufacturer 104 may be considered to include reference to the secure element or device produced thereby. Portal 106 may, for example, include a registration and provisioning server in operable communication with a registration database (not shown in FIG. 1). In an embodiment, portal 106 may include a local CA, and/or may be in operable communication with a remote CA.

In exemplary operation, architecture 100 implements managed PKI process 102 to enable deployment of bootstrap certificates for device/element provisioning. In an embodiment, process 100 begins at step S108, in which manufacturer 104 generates at least one subCA for at least one customer. In step S110, manufacturer 104 sends a subCA certificate to portal 106 and associates the subCA certificate with the at least one customer. In step S112, portal 106 registers the received subCA certificate for the specific client to which the subCA certificate was generated by manufacturer 104.

In step S114, manufacturer 104 issues one or more customer-requested certificates for a requesting customer(s). In step S116, manufacturer 104 sends the issued customer-requested certificates to portal 106. In an exemplary embodiment of step S116, the issued certificates are sent in batches. In other embodiments, the issued certificates are sent in real-time as they are issued, or at scheduled delivery times. In step S118, portal 106 pre-issues certificates corresponding to the received issued certificates (e.g., AWS certificates) and registers the pre-issued certificates in an account of the requesting customer.

According to the advantageous configuration of architecture 100 and process 102, portal 106 is capable of providing services for manufacturer 104 that enable manufacturer 104 to: (i) register a new client (which may include additional approval steps where there is no client history); (ii) request a new subCA certificate (and keypair) that may be issued in-line, and in a matter of seconds (i.e., no additional approvals are required, with this capability being managed completely by manufacturer 104); (iii) register an existing subCA certificate, such as in the case where it is desirable to integrate an existing client or clients; (iv) assign a subCA to a specific client, whether the specific client is a new or existing client on portal 106; and (v) requests a revocation of subCA(s) certificates, such as in the case of a compromised certificate, customer agreement issues, etc.

Architecture 100 and process 102 provide still further advantages over conventional techniques. For example, according to the present embodiments, a client is enabled to register itself, either directly, or through a manufacturer-provided client link (e.g., generated through portal 106). Upon approval, portal 106 is further enabled to provide a managed ecosystem certificates (e.g., AWS certificates) to the client through portal 106, and its associated application programming interface(s) (API(s)). These managed ecosystem certificates may be provided on a per-subCA or a per-device revocation basis, and may further be subject to automatic re-provisioning or renewal. According to these exemplary embodiments, architecture 100 is able to further achieve automatic integration with the ecosystem (e.g., AWS), and the client is able to register for additional ecosystem certificates as desired or needed.

As described further below with respect to FIGS. 2 and 3, in an exemplary embodiment, portal 106 is configured to host the roots, as well as the substantial majority of signing subCAs for provisioning the bootstrap certificates. According to this configuration, manufacturer 104 may then host the production subCA(s) that sign the bootstrap device certificates.

Figure 2:
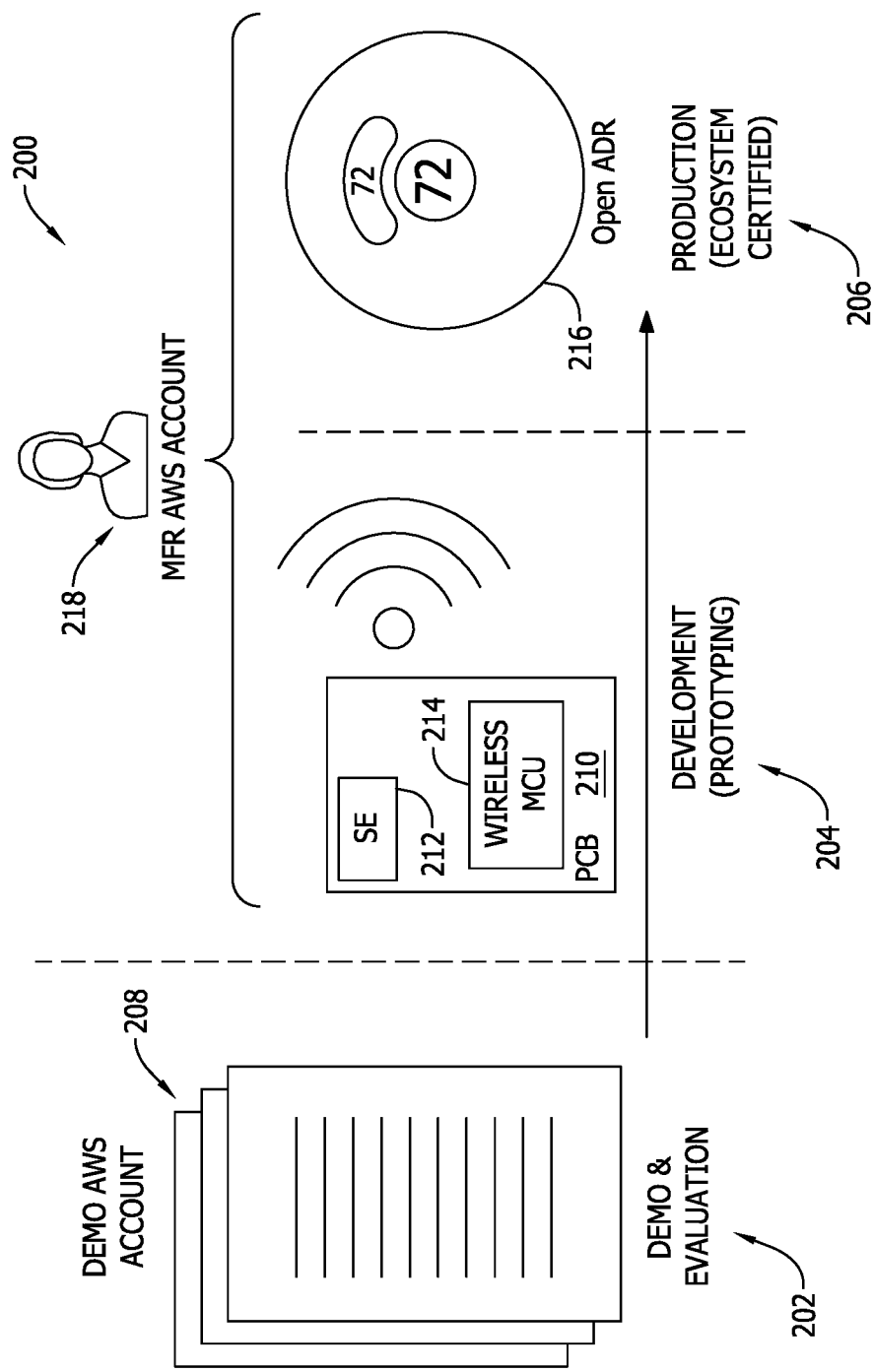
FIG. 2 is a schematic illustration depicting a design process flow for a secure device.

FIG. 2 is a schematic illustration depicting a design process flow 200 for a secure device. Design process flow 200 is depicted in FIG. 2 with respect to an AWS ecosystem for ease of explanation. In an exemplary embodiment, design process flow 200 enables security implementation in a seamless manner across the several domains of the design process. More particularly, design process flow 200 includes a demo domain 202, a development domain 204, and a production domain 206. For purposes of PKI security, for example, demo domain 202 utilizes a demo AWS account 208 for demo and evaluation, and development domain 204 includes an electronic device 210 (e.g., including a printed circuit board (PCB)). Device 210 may further include such components as a secure element 212, and a wireless microcontroller (MCU) 214. In an embodiment, production domain 206 may integrate with a different ecosystem 216 (e.g., OpenADR, as depicted in FIG. 2), then the ecosystem of demo account 208. In this example, development domain 204 and production domain 206 together form a portion of a manufacturer AWS account 218.

The exemplary embodiment depicted in FIG. 2 thus illustrates the advantageous utility of implementing bootstrap certificates according to the systems and methods of the present application. As described further below with respect to FIG. 3, use of bootstrap certificates, and the associated process flow there with, results in a significant simplification to the conventionally-complex process of establishing a PKI when applied to IoT- and networked-device designs.

As illustrated in FIG. 2, the three principle phases of device design process flow 200 are (1) initial demonstration and evaluation (e.g., demo domain 202), (2) prototyping and development iteration (e.g., development domain 204), and (3) production and ecosystem certification (e.g., production domain 206). Through the advantageous embodiments described herein, an individual customer (e.g., a device maker) is enabled, across all three principle design phases, to automate all security-related subprocesses through coordination between, for example, prepackaged firmware and backend systems of portal 106. According to the present innovative embodiments, the workflow automation is accomplished without meaningful compromises to security best practices, thereby significantly improving the developer experience.

Figure 3:
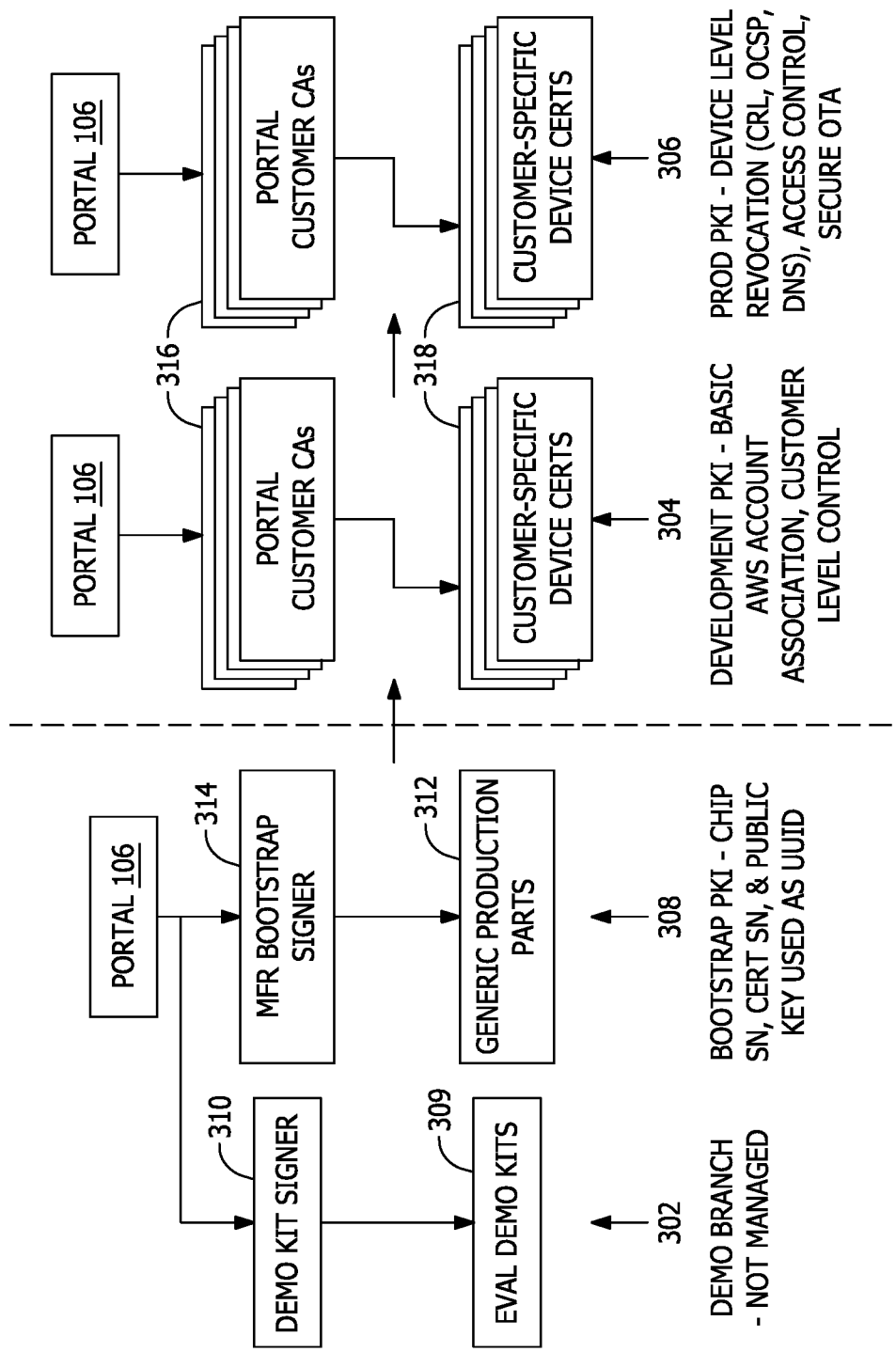
FIG. 3 is a schematic illustration depicting a PKI domain structure for developer migration, in accordance with an embodiment.

FIG. 3 is a schematic illustration depicting a PKI domain structure 300 for developer migration. PKI domain structure 300 is similar to design process flow 200, in that PKI domain structure also includes a demo domain 302, a development domain 304, and a production domain 306. In the exemplary embodiment depicted in FIG. 3, a bootstrap domain 308 is also illustrated within the process flow of structure 300. Accordingly, in this example, each of development domain 304, production domain 306, and bootstrapping domain 308 are separate PKI domains, whereas demo domain 302 is not managed. That is, each of the three separate PKI domains 304, 306, 308 are configured with specific functionality within the overall process flow to better enable migration of the developer through the several PKI domains.

More particularly, the three separate PKI domains enable structure 300 to maintain security throughout the process flow, but without requiring involvement by the semiconductor manufacturer (e.g., manufacturer 104) in the ongoing management of the PKI. In order to perform a revocation, for example, the signer of the device certificate(s) must issue and sign the corresponding certificate revocation list (CRL). In the conventional system, which does not include separate bootstrap and production PKIs, the revocation would the device's/chip's production signer to issue and sign revocation the CRLs, which is neither desirable nor practical.

In an exemplary embodiment, demo domain 302 and bootstrap PKI domain 308 represents two separate branches through which manufacturer 104 and portal 106 may interact to implement bootstrap PKI for demo kits and generic part production. The first branch is thus represented by demo domain 302, which constitutes an unmanaged signer branch under which evaluation demo kits 309 will reside, signed by demo kit signer(s) 310. Bootstrap PKI domain 308 therefore represents a separate signer branch under which bootstrap certificates are generated for use in, for example, secure element chips of generic production parts 312, which certificates may then be signed by the manufacturer bootstrap signer 314. In an exemplary embodiment of bootstrap PKI domain 308, portal 106 hosts the root. Nevertheless, device certificate signers on the next level down from the root (e.g., bootstrap signer 314) may be hosted by manufacturer 104 in the secure factory facilities thereof. Bootstrap PKI domain 308 may include the serial numbers of the respective chips/elements and certificates, as well as public keys used as universally unique identifiers (UUIDs).

Further to the exemplary embodiment, development PKI domain 304 functions to provide general account association for the ecosystem (AWS, in this example), and also customer-level control through prototyping and other development of a device/element for one or more ecosystems. Development PKI domain 304 thus provides device developers with a virtual "sandbox" where products under development may be signed and operate under a fully operational PKI that is separate from those that are already released to production. In an embodiment, development PKI domain 304 obtains or generates a number of portal customer CAs 316 and customer-specific device certificates 318. Under this exemplary configuration, "soft-CA" signers may be generated with a unique key and signer being assigned to each registered customer. Such soft-CAs are able to then generate and sign development device certificates.

In some embodiments, the development device certificates are configured to have a relatively short validity period. In at least one embodiment, the soft-CAs are hosted on hardened servers in a multi-layer secure datacenter associated with portal 106 (e.g., integrally, or a contracted third-party server). In some cases, where the development certificates are intended only for brief development and prototyping purposes, techniques for provisioning the development certificates may be performed over the Internet and include some manual processing.

In contrast, production PKI domain 306 is configured to enable full certificate and device lifestyle by portal 106. Production PKI domain 306 is also capable of managing portal customer CAs 316 and customer-specific device certificates 318, but is alternatively configured to provide full functionality of lifecycle management, quarantine, device-level revocation (e.g., CRL, OCSP, DNS), access control, as well as future services such as Secure OTA device updates. In an exemplary embodiment, production PKI domain 306 is operable to generate Cloud service and ecosystem certificates that will be pushed to devices in the final production state thereof (described further below with respect to FIG. 16).

Figure 4:
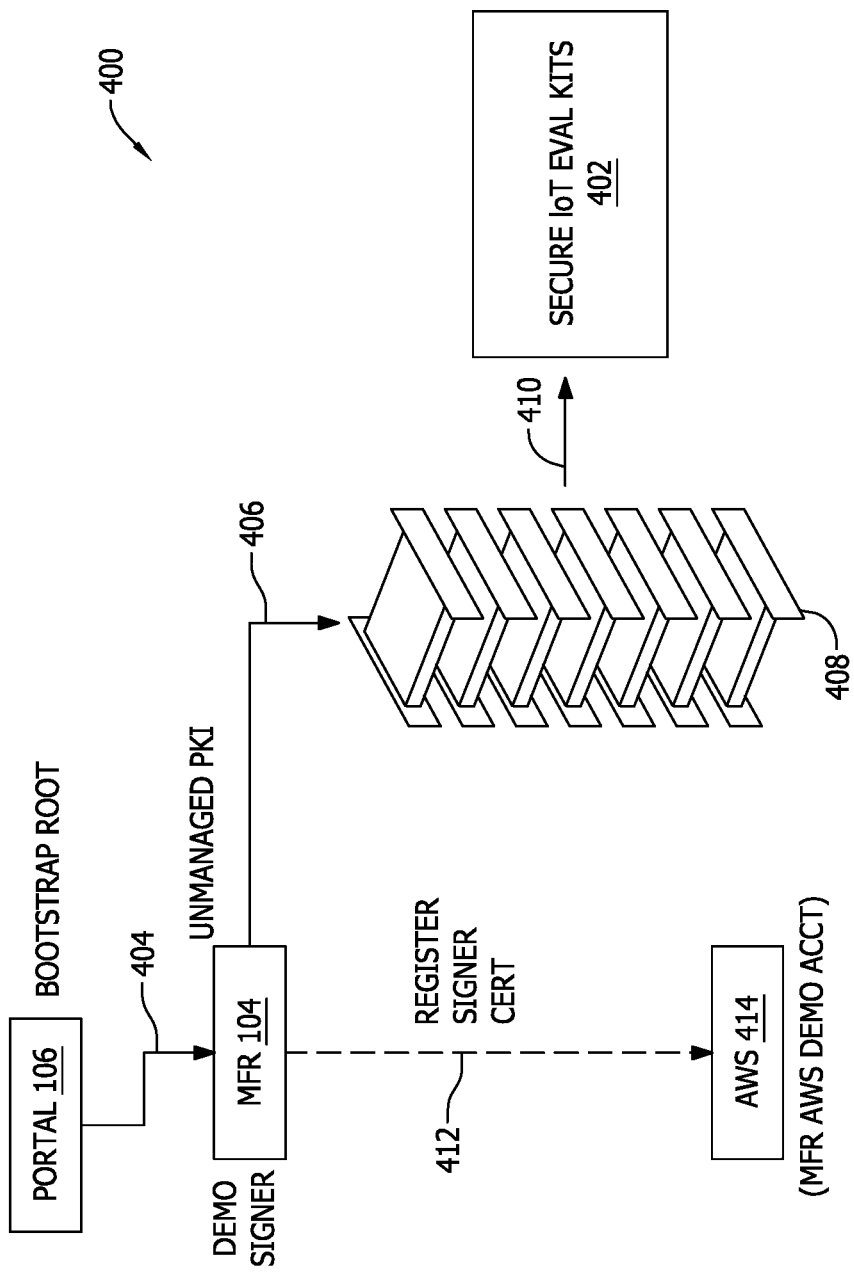
FIG. 4 is a schematic illustration of a demo kit provisioning process that may be implemented with the architecture depicted in FIG. 1 and the PKI domain structure depicted in FIG. 3.

FIG. 4 is a schematic illustration of a demo kit provisioning process 400 that may be implemented with architecture 100, FIG. 1 and PKI domain structure 300, FIG. 3. In an exemplary embodiment of demo kit provisioning process 400, manufacturer 104 manufacturers demo kits 402 that serve as a means for prospective customers to evaluate the manufacturers hardware, and also to provide a reference design for the customer to implement within their own device designs. That is, in this example, manufacturer 104 manufactures the secure element, and the customer assembles the eventual IoT device.

With respect to evaluation kits 402, manufacturer 104 utilizes the demo signer (e.g., demo kit signer 310, FIG. 3), which is a separate branch (e.g., demo domain 302) from the bootstrap PKI (e.g., bootstrap PKI domain 308), to sign demo kits 402. Demo kits 402 may, for example, be similar to evaluation demo kits 309, FIG. 3. In the exemplary embodiment, in a bootstrap assigning step 404, the bootstrap root of portal 106 signs a certificate signing request ("CSR") (e.g., from an HSM operating on the production line of manufacturer 104), which may be part of the unmanaged PKI of demo domain 302. In a provisioning step 406, manufacturer 104 provisions one or more chips 408 under this signer. In an assembly step 410, provisioned chips 408 are assembled into pre-packaged evaluation kits 402.

In an exemplary embodiment, process 400 further includes a registration step 412, in which the demo kit signer registers with an ecosystem 414 (e.g., AWS) under the AWS IoT demo account of manufacturer 104. In this exemplary embodiment, the signer certificate is also registered at AWS ecosystem 414 under the same manufacturer AWS demo account, such that the eventual devices may automatically authenticate (and appear in the demo account) for simple out-of-the-box ("OOB") operation for the customer, as described further below with respect to FIG. 5.

Figure 5:
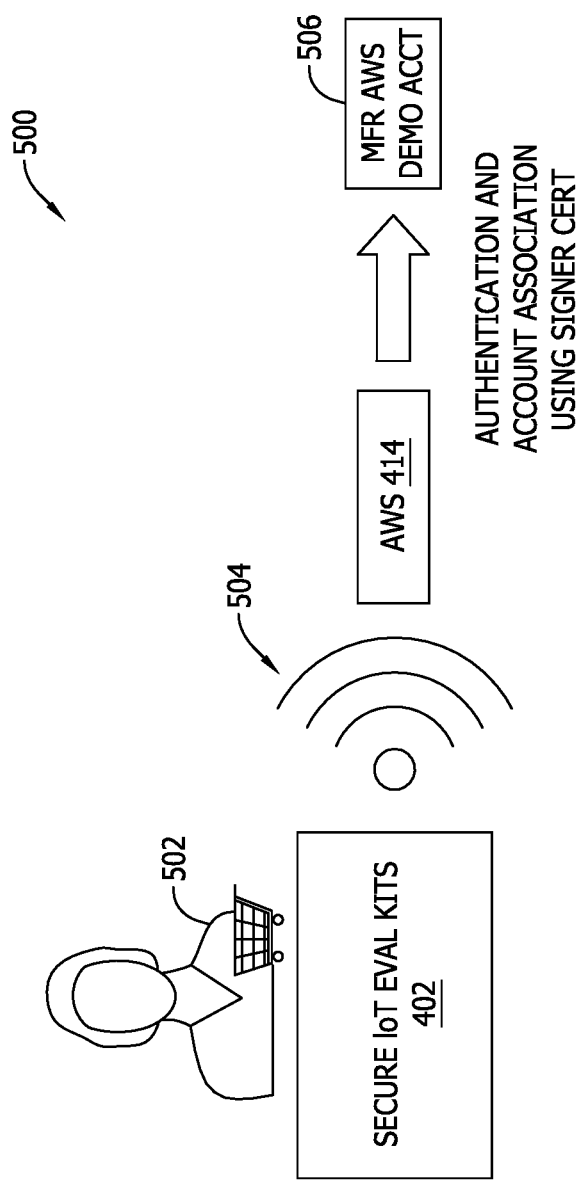
FIG. 5 is a schematic illustration of a demo kit usage and authentication process that may coincide with the demo kit provisioning process depicted in FIG. 4.

FIG. 5 is a schematic illustration of a demo kit usage and authentication process 500 that may coincide with demo kit provisioning process 400, FIG. 4. In an exemplary embodiment, process 500 represents an OOB quick start demo operation of one or more kits 402 for a user 502. More particularly, process 500 may represent an illustrative example of an initial power on operation of kit 402 by user 502. In this operation, kit 402 may be configured to automatically connect to AWS 414 once upon establishment of a Wi-Fi link 504. Because, according to the embodiments described above, kit 402 is pre-provisioned with the bootstrap certificate, and because the bootstrap signer certificate is registered with AWS 414, kit 402 may automatically associate with manufacturer AWS demo account 506, such that the developer is enabled to access the device through the Cloud and perform basic control operations on kit 402 contained therein.

In the exemplary embodiment, from manufacturer AWS demo account 506, user 502 is further enabled to view the appearance of the device therein, and also to control some functions of the device through the Cloud. Through this advantageous configuration of process 500, customers are advantageously enabled to experience and evaluate features of a provisioned chip (e.g., chip 408, FIG. 4) with minimal setup, and with minimal prior knowledge of the chip itself. In at least one embodiment, process 500 represents a first design flow step/subprocess of a greater initial evaluation process.

Figure 6:
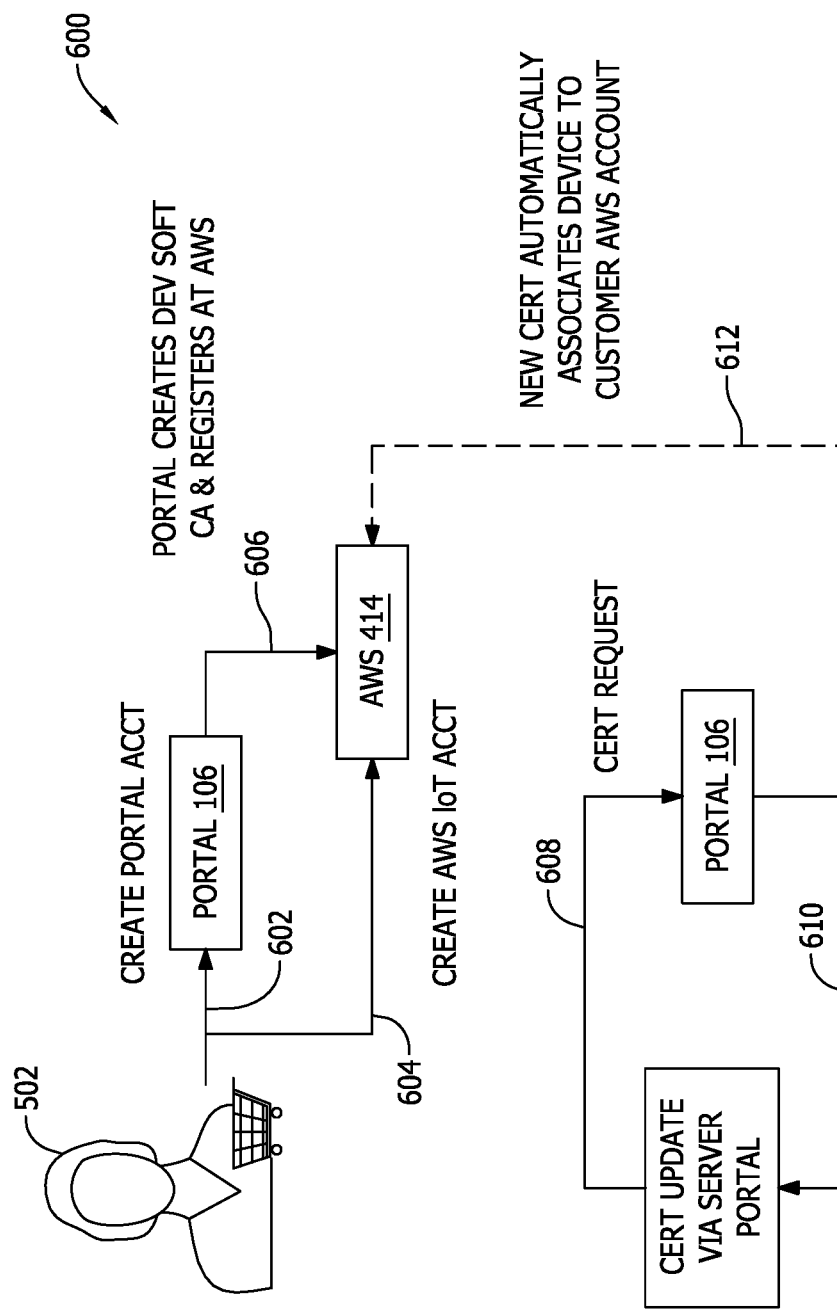
FIG. 6 is a schematic illustration of a development provisioning process that may be implemented with the embodiments described herein.

FIG. 6 is a schematic illustration of a development provisioning process 600 that may be implemented with the embodiments described herein. In an exemplary embodiment, process 600 represents a prototyping operation that may be implemented in a complementary fashion, for example, with usage and authentication process 500, FIG. 5. More particularly, as part of the development process of the overall design flow, user 502 is enabled to, in step 602, create an individual user portal account with portal 106, and in step 604, create an individual AWS IoT account, for AWS 414. Upon creation of user portal account by user 502, portal 106 may be further configured to, in step 606, create a soft-CA for user 502 (e.g., under development PKI domain 304, FIG. 3), which may then be used to perform signing requests from devices under development by that device maker/assembler. In some embodiments, such certificates for devices under development may fall under the manufacturer's development PKI, and therefore be configured to have limited lifetimes.

In further exemplary operation process 600, user 502 is enabled to initiate a certificate request to the particular manufacturer's development PKI, for example, through a physical connection of evaluation kit 402 to a PC by way of a USB port. The development PKI of manufacturer 104 may then create & a development certificate, and push the development certificate to kit 402. Once kit 402 is power-cycled, kit 402 is enabled to connect with AWS 414 and associate with the AWS IoT account (e.g., created in step 604), instead of manufacturer AWS demo account 506. Process 600 may be further implemented by the device manufacturer (e.g., user 502) for other devices under development as well.

Additionally, in the prototyping and development design flow, once a customer desires to proceed with the development of the customer's own design (i.e., using a reference design of manufacturer 104 and certificates from portal 106), the customer is enabled to create the customer's own AWS IoT account (e.g., step 604) and the customers own portal account (e.g., step 602). The customer (e.g., user 502) may, for example, provide portal 106 with the customer's own AWS IoT account information, such that portal 106 may automatically register signer subCA certificates to the customer's AWS IoT account. In some embodiments, portal 106 is further enabled, in step 608, to receive certificate requests and, in step 610, respondent to the certificate requests with certificate updates. Optionally, in step 612, portal 106 may provide new certificates, or the certificate updates, to AWS 414 to enable the automatic association of the device to the customer's AWS IoT account.

Figure 7:
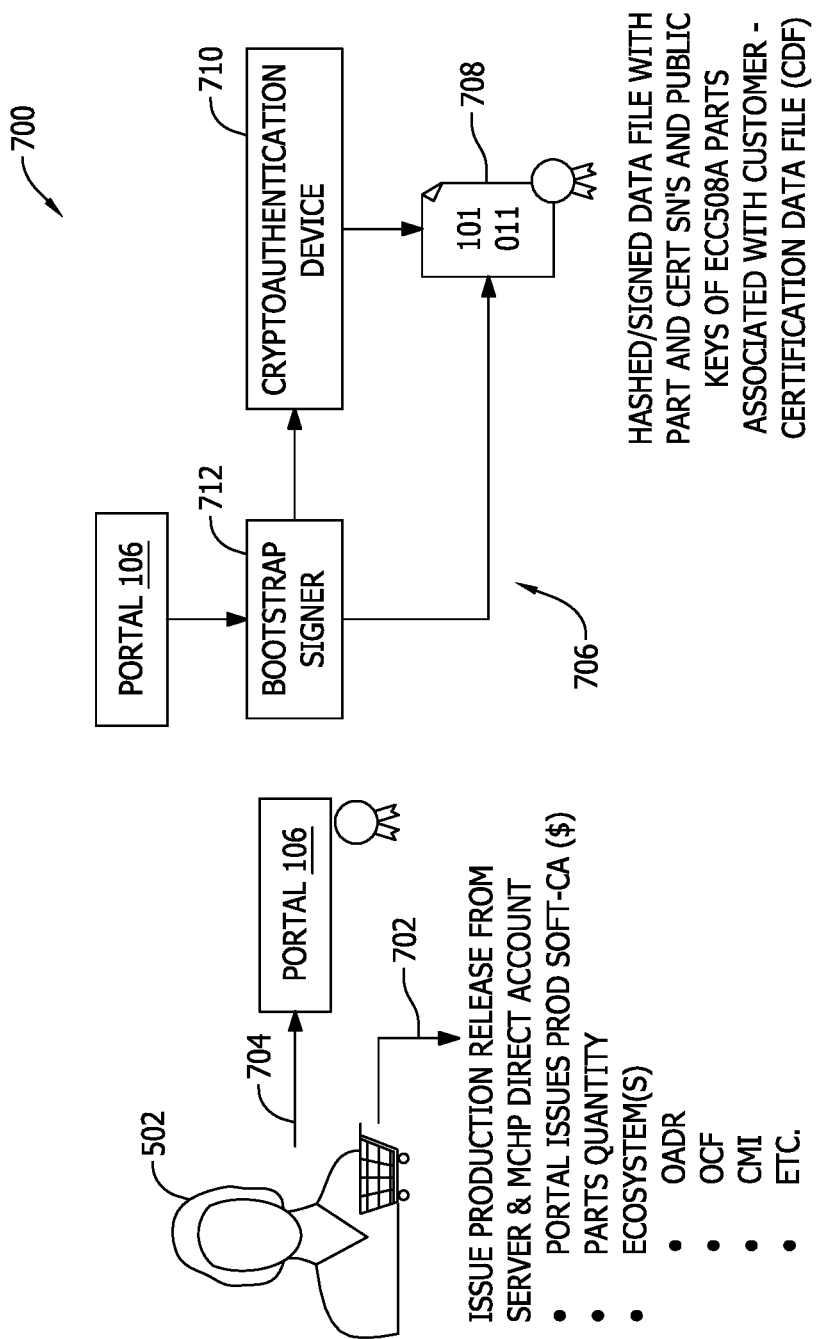
FIG. 7 is a schematic illustration of a production provisioning process that may be implemented with the embodiments described herein.

FIG. 7 is a schematic illustration of a production provisioning process 700 that may be implemented with the embodiments described herein. In an exemplary embodiment, production provisioning process 700 is executed when a customer (e.g., user 502) desires to proceed to the production domain of the process flow. In this case, the customer will, in step 702, issue production orders to manufacturer 104 for chips, and in step 704, two portal 106 for a production soft-CA (e.g., where a soft-CA has not already been created therefore). This stage may, for example, represent a first financial charge to the customer in the case where there might be a fee to create the production soft-CA.

In some embodiments, manufacturer 104 may have a pre-manufactured inventory of chips that are signed and provisioned off the bootstrap PKI. When manufacturer 104 receives the order, manufacturer 104 may then read out the chip serial number, the bootstrap certificate, and public keys for all key pairs pre-generated in the chips. In an exemplary embodiment, manufacturer 104 further executes a subprocess 706 to generate a certificate data file (CDF) 708 from a cryptoauthentication element 710 of the chip, the certificate from bootstrap signer 712 and key information, for all parts shipped to the customer.

Figure 8:
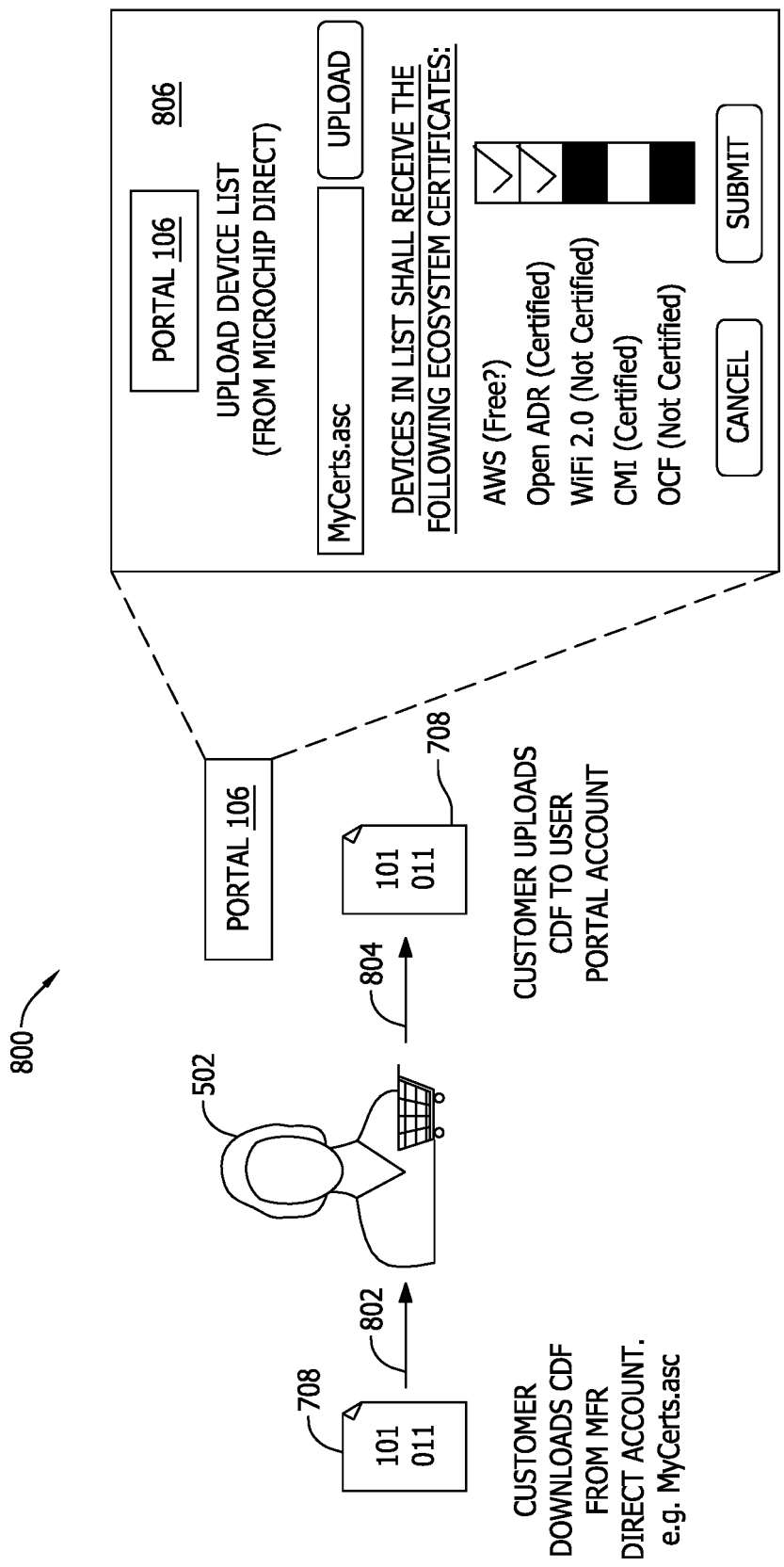
FIG. 8 is a schematic illustration of a customer provisioning process that may coincide with the production provisioning process depicted in FIG. 7.

FIG. 8 is a schematic illustration of a customer provisioning process 800 that may coincide with production provisioning process 700, FIG. 7. In exemplary operation of customer provisioning process 800, user 502, in step 802, downloads CDF 708 from manufacturer 104 and then, in step 804, uploads CDF 708 to the customer's own user portal account within portal 106 (e.g., under an order certificates page/webpage 806). Through a user interface (not shown in FIG. 8) accessing page 806, user 502 is enabled to indicate what ecosystem certificates are to be associated with the list of parts being uploaded. In at least one embodiment, portal 106 may then count the number of devices in CDF 708, and calculate the per-certificate fees (if any) when user 502 places an order from page 806. In some cases, the user AWS IoT certificate will not generate a separate fee. In other cases, the customer AWS IoT certificate is subject to a tiered the structure.

Figure 9:
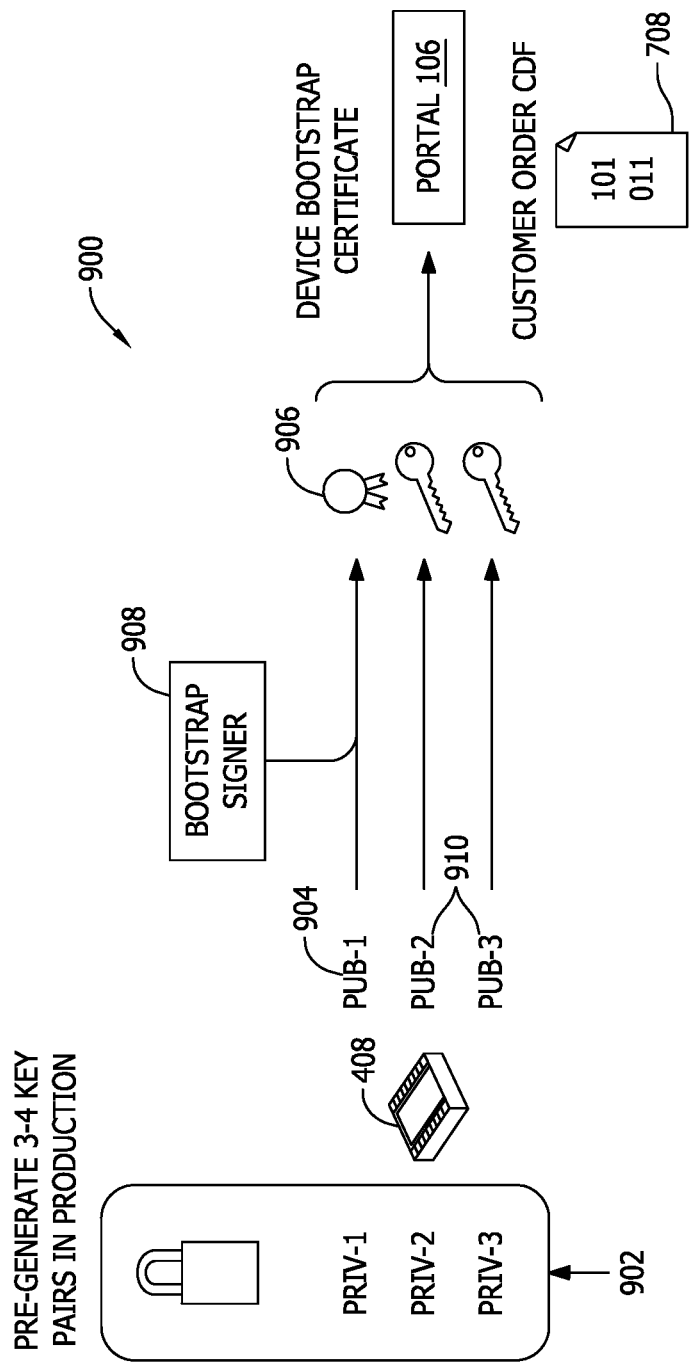
FIG. 9 is a schematic illustration of a production key generation process that may be implemented with the embodiments described herein.

FIG. 9 is a schematic illustration of a production key generation process 900 that may be implemented with the embodiments described herein. In an exemplary embodiment, during production, each chip 408 is configured to perform a pre-generation subprocess 902 to generate 3-4 key pairs during testing. A first generated key 904 is used to construct bootstrap certificate 906 with bootstrap signer 908. Other pre-generated keys 910 are sent, along with bootstrap certificate 906, two portal 106 for use in ecosystem certificates to be created by portal 106. In some embodiments, each device bootstrap certificate 906, serial number of chip 408, and public key 910 are logged into CDF 708 that is provided to the customer from manufacturer 104 (or a distributor thereof).

Figure 10:
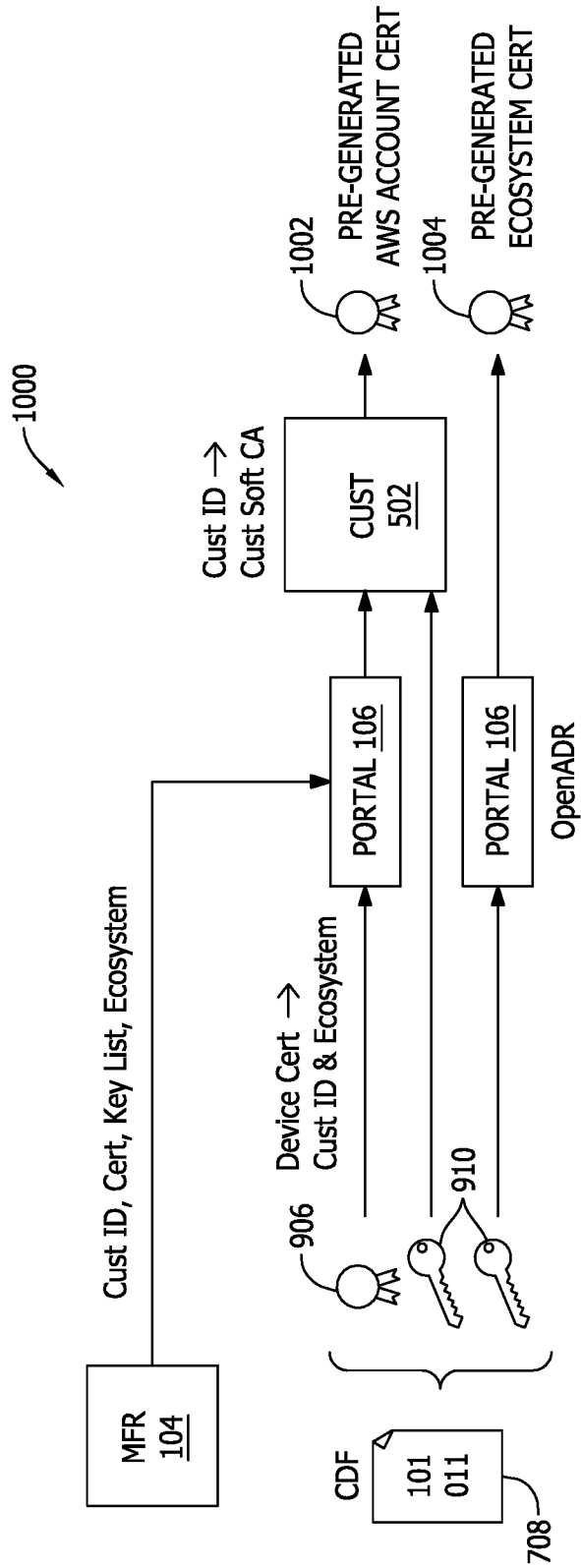
FIG. 10 is a schematic illustration of a certificate pre-generation process that may coincide with the production key generation process depicted in FIG. 9.

FIG. 10 is a schematic illustration of a certificate pre-generation process 1000 that may coincide with production key generation process 900, FIG. 9. In an exemplary embodiment of certificate pre-generation process 1000, the backend of portal 106 may be configured to automatically know the appropriate ecosystem 414 with which to associate the device, as well as the particular ecosystem certificates that are required. Process 1000 may occur, for example, when a customer (e.g., user 502) uploads CDF 708 from a recent order. Upon uploading, each device certificate may be logged to require field provisioning, such that when the particular device certificate is observed during initial setup, the backend of portal 106 automatically associates the device and ecosystem certificates. In this example, because CDF 708 includes extra public keys 910 associated with bootstrap certificate 906, portal 106 may be further configured to pre-generate AWS account certificates 1002 and ecosystem certificates 1004 when, for example, the respective devices contact/communicate with portal 106.

Figure 11:
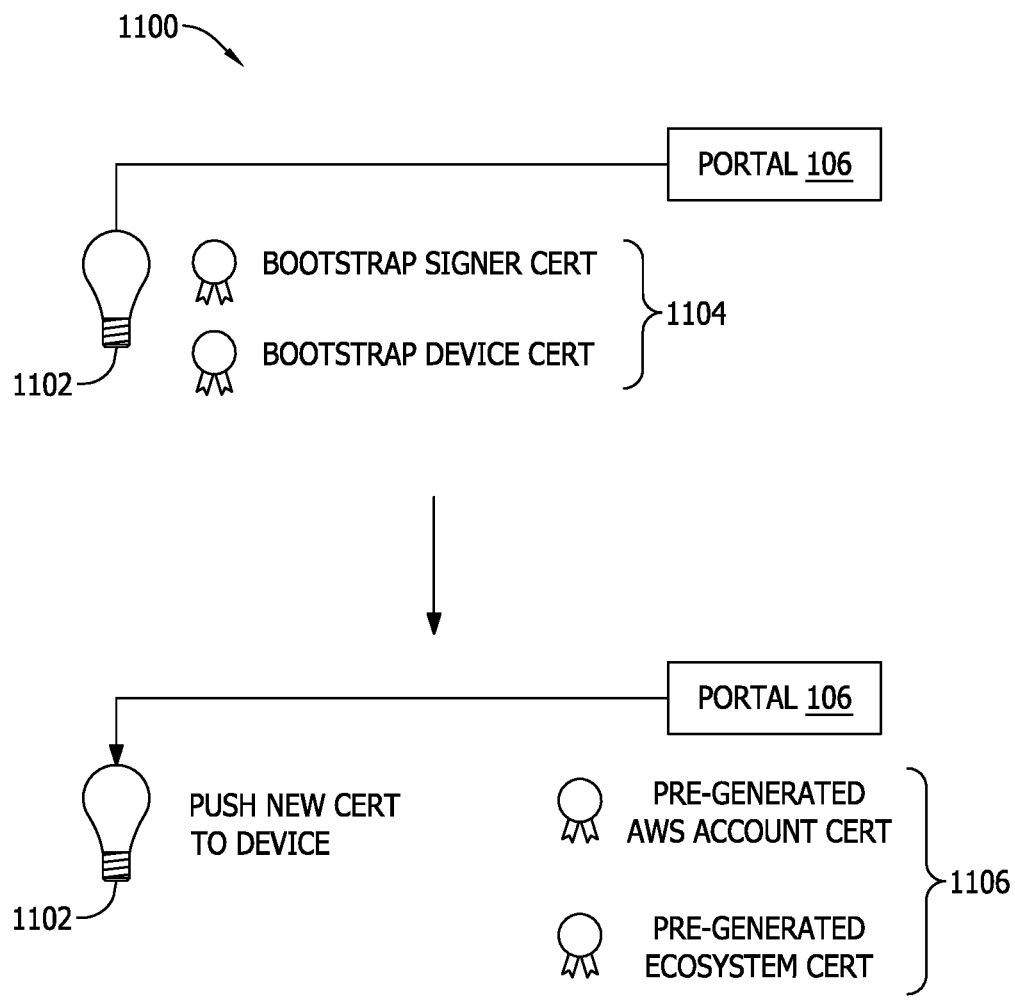
FIG. 11 is a schematic illustration of a bootstrap provisioning process that may coincide with the key generation process depicted in FIG. 9 and the certificate pre-generation process depicted in FIG. 10.

FIG. 11 is a schematic illustration of a bootstrap provisioning process 1100 that may coincide with key generation process 900, FIG. 9 and certificate pre-generation process 1000, FIG. 10. In an exemplary embodiment, bootstrap provisioning process 1100 may be configured to automatically execute when a device 1102 first powers on (e.g., during a system test at the device manufacturer, or potentially during use in the field). In a first subprocess 1104, when device 1102 first connects to the Internet, device 1102 may be programmed to additionally automatically contact the bootstrap server of portal 106. The bootstrap server of portal 106 may then look up the certificate of the device and retrieve pre-generated AWS account certificates 1002 and pre-generated ecosystem certificates 1004. Portal 106 may thus validate the bootstrap certificate and the signer certificate(s).

In a second subprocess 1106 portal 106 pushes the new certificates to device 1102 and completes bootstrap provisioning process 1100. Because these new certificates utilize public keys 910 that were generated during production, the corresponding private keys need never be sent over the network. Furthermore, bootstrap 906 thus serves to tie the new certificates and public keys to a specific device 1102, such that it is already known that the pre-generated certificates will correspond to the private keys in the device. Bootstrap certificate 906 and the private keys may therefore remain in the device in case of a system reset, or if either are needed for future provisioning.

Figure 12:
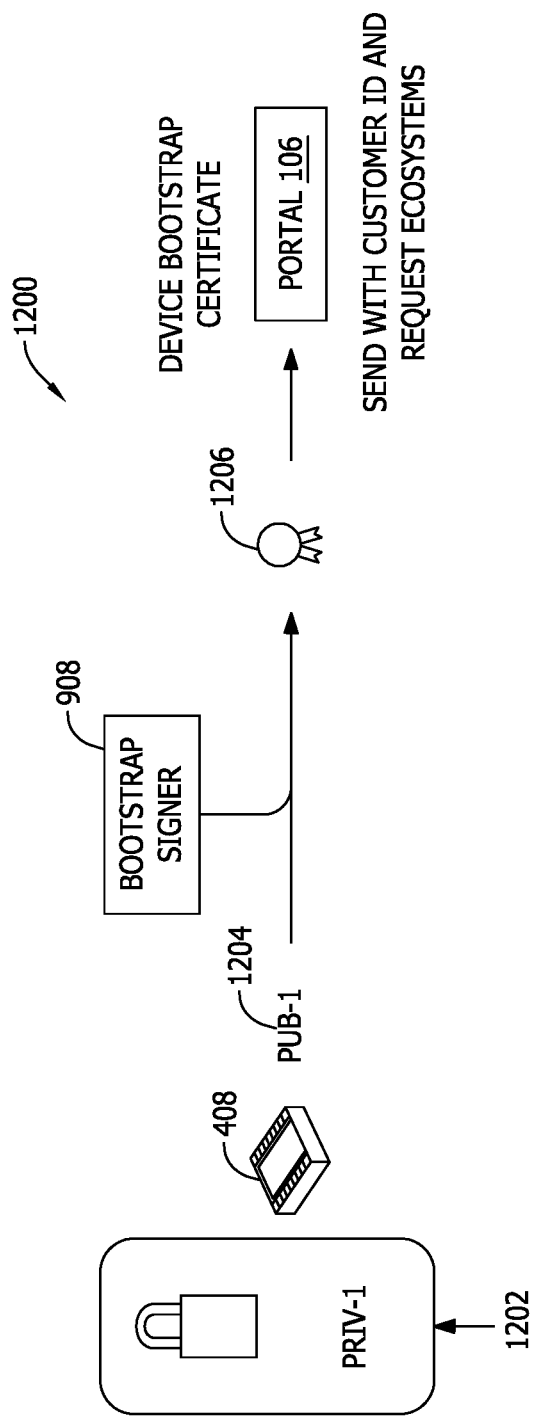
FIG. 12 is a schematic illustration of an alternative production key generation process that may be implemented with the embodiments described herein.

FIG. 12 is a schematic illustration of an alternative production key generation process 1200 that may be implemented with the embodiments described herein. Production key generation process 1200 is similar to production key generation process 900, FIG. 9, and may be alternatively implemented during production of chip(s) 408. Process 1200 differs though, from process 900, in that process 1200 performs an alternative pre-generation subprocess 1202 to generate only a single keypair, from which a soul generated public key 1204 is used to construct, with bootstrap signer 908, bootstrap certificate 1206. Process 1200 may be desirable, for example, in the case where generation of additional keypairs is considered overly expensive, and/or time-consuming. In such cases, process 1200 may be advantageously implemented such that the device will generate only one keypair for bootstrap certificate 1206, and other keys may then be generated for certificates in real-time over the Internet as needed. In the exemplary embodiment, bootstrap certificate 1206 is provided in CDF 708 for each such device shipped to the customer.

Figure 13:
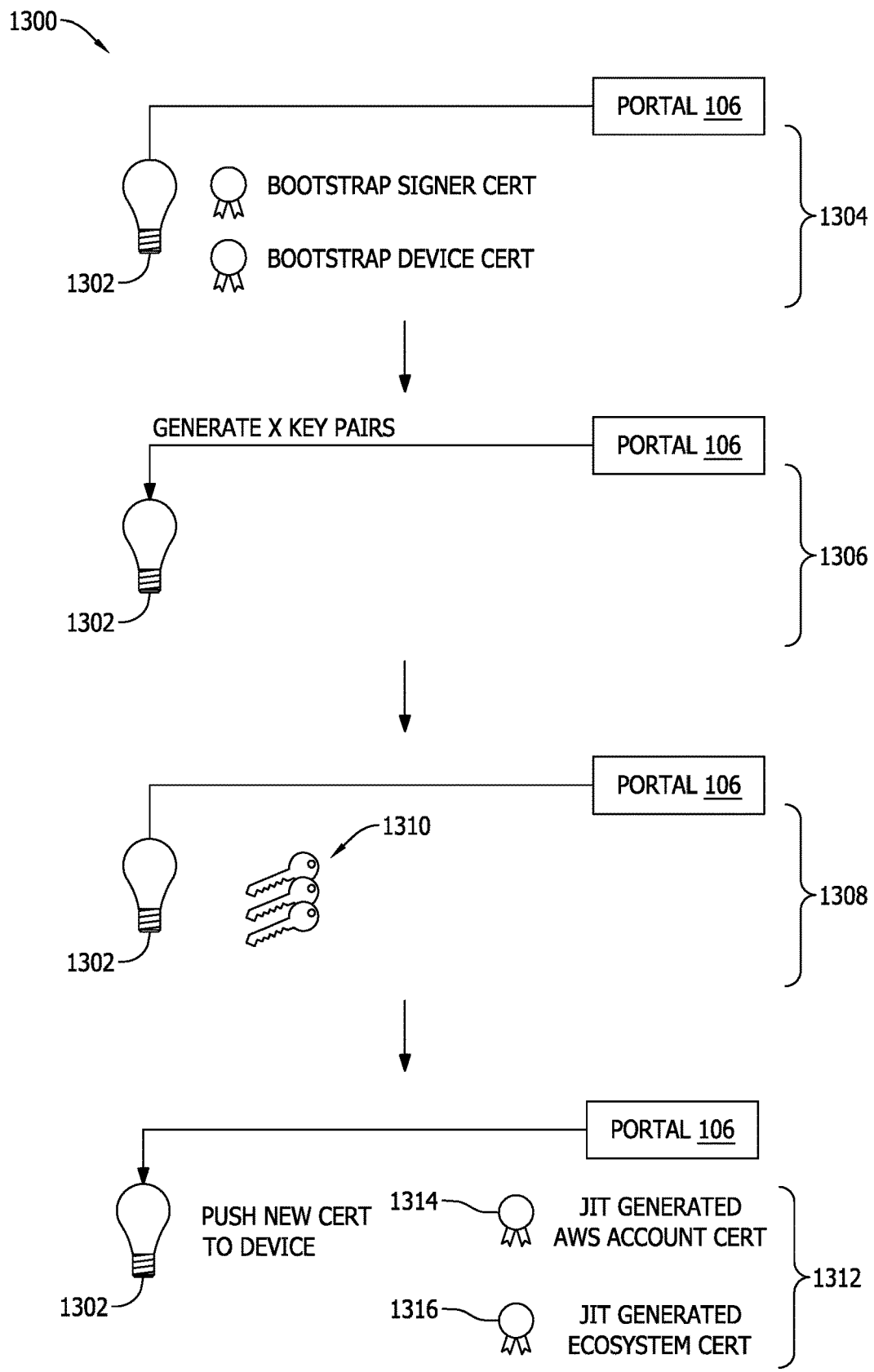
FIG. 13 is a schematic illustration of a bootstrap provisioning process that may coincide with the alternative production key generation process depicted in FIG. 12.

FIG. 13 is a schematic illustration of a bootstrap provisioning process 1300 that may coincide with alternative production key generation process 1200, FIG. 12. In the exemplary embodiment, bootstrap provisioning process 1300 represents a just-in-time (JIT) operation for generating additional certificates in real-time. In an exemplary embodiment, bootstrap provisioning process 1300 may be configured to automatically execute when a device 1302 connects to the bootstrap server of portal 106. In a first subprocess 1304, portal 106 may be configured to automatically determine (e.g., from CDF 708 uploaded by user 502) what certificates device 1302 requires for ecosystem operation.

In a second subprocess 1306, from the customer order, portal 106 instructs device 1302 to generate a number of keypairs corresponding to the number of ecosystems requested by the customer (e.g., in page 806). In a third subprocess 1308, device 1302 generates the instructed number of keypairs 1310, signs the public keys thereof with the bootstrap private key, and sends the public keys to the bootstrap server of portal 106. In a fourth subprocess 1312, the bootstrap server of portal 106 uses the received public keys to generate JIT-generated AWS (or OpenADR, etc.) account certificates 1314 and JIT-generated ecosystem certificates 1316. The bootstrap server may then be further configured such that portal 106 will push the new JIT certificates to device 1302 and complete provisioning process 1300.

Figure 14:
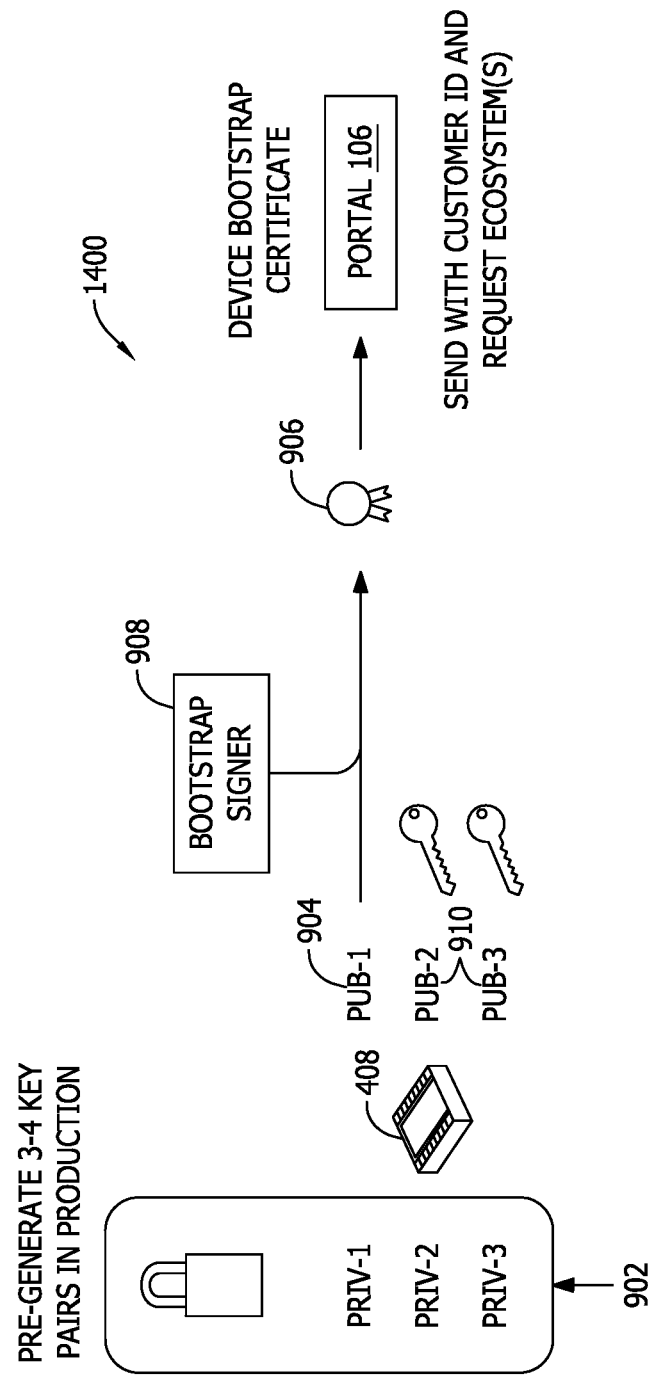
FIG. 14 is a schematic illustration of an alternative production key generation process that may be implemented with the embodiments described herein.

FIG. 14 is a schematic illustration of an alternative production key generation process 1400 that may be implemented with the embodiments described herein. Production key generation process 1400 is similar to production key generation process 900, FIG. 9, in that process 1400 also executes subprocess 902 for chip(s) 408, and generates a first public key 904, and additional public keys 910. Also similar to process 900, process 1400 uses first public key 904 to generate bootstrap certificate 906 with bootstrap signer 908. Different though, from process 900, process 1400 does not send additional public keys 904 to portal 106 along with bootstrap certificate 906 in CDF 708. This embodiment may be useful in the case where it is not costly to generate additional keypairs, but particular ecosystem elements, costs, or other parameters may indicate the desirability to retain the additional public keys until further needed.

Figure 15:
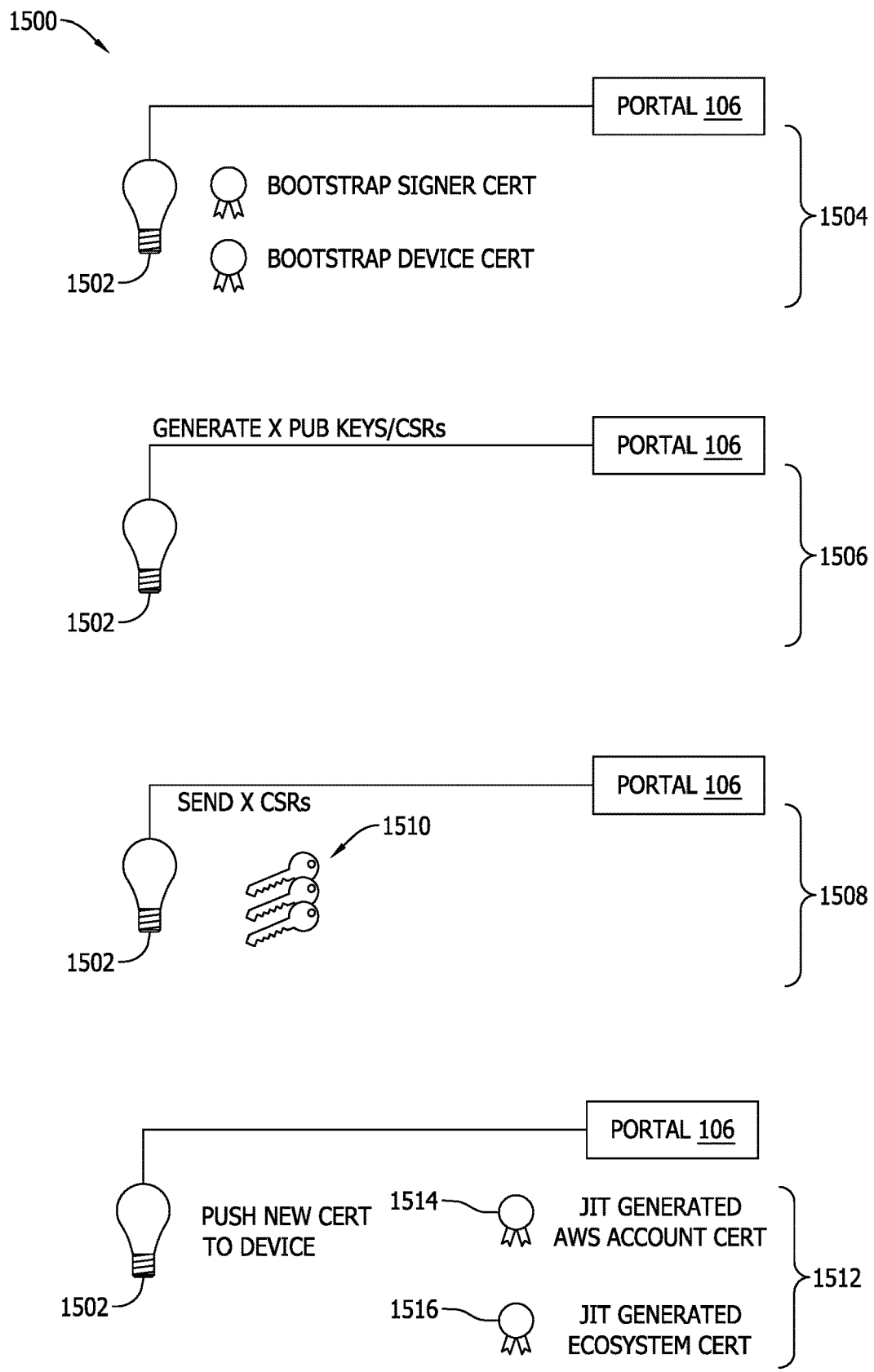
FIG. 15 is a schematic illustration of a bootstrap provisioning process that may coincide with the alternative production key generation process depicted in FIG. 14.

FIG. 15 is a schematic illustration of a bootstrap provisioning process 1500 that may coincide with alternative production key generation process 1400, FIG. 14. Key generation process 1500 is similar to key generation process 1300, FIG. 13. For example, process 1500 similarly represents a JIT operation for generating additional certificates in real-time, and may be configured to automatically execute when a device 1502 connects to the bootstrap server of portal 106. Additionally, process 1500 includes a first subprocess 1504, in which portal 106 may be configured to automatically determine (e.g., from CDF 708 uploaded by user 502) what certificates device 1502 requires for ecosystem operation.

However, process 1500 differs from process 1300 with respect to a second subprocess 1506, in which, instead of requesting key generation by device 1502, portal 106 alternatively instructs device 1502 to provide only public keys that have been pre-generated and signed. Thus, in a third subprocess 1508, device 1502 sends to portal 106 only public keys 1510 that have been pre-generated and signed. In a fourth subprocess 1512, the bootstrap server of portal 106 uses the received public keys to generate JIT-generated AWS (or OpenADR, etc.) account certificates 1514 and JIT-generated ecosystem certificates 1516, similarly to process 1300. The bootstrap server then pushes the new JIT certificates to device 1502 to complete provisioning process 1500.

Figure 16:
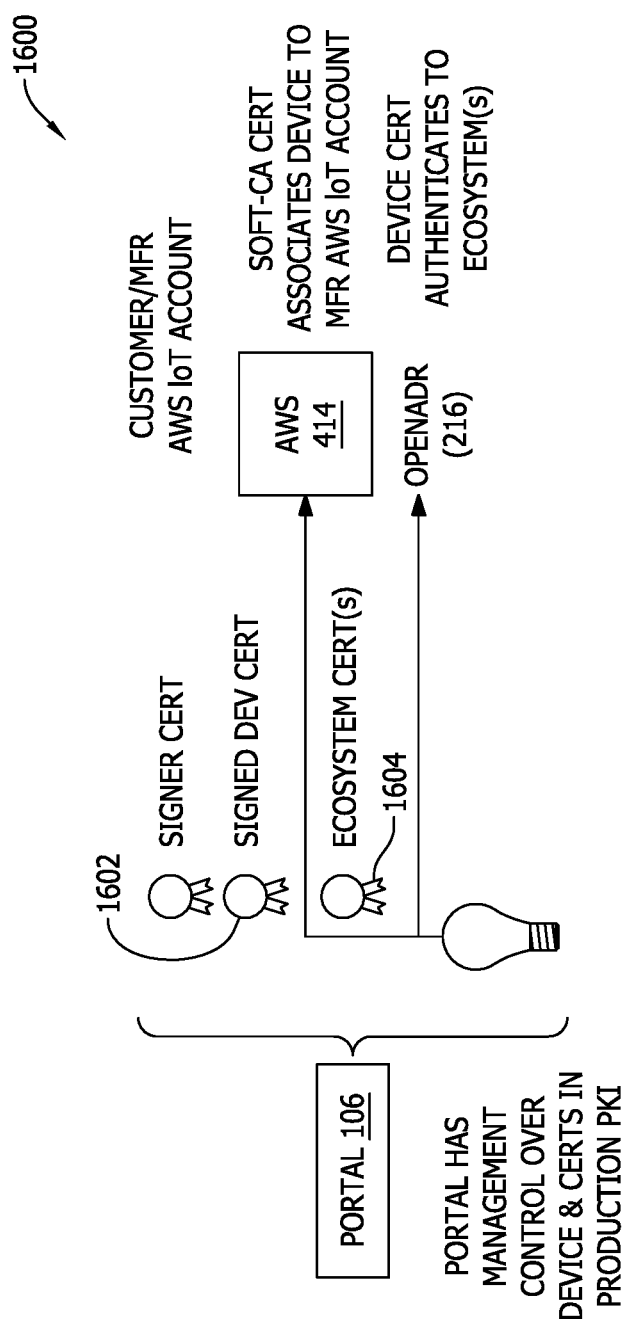
FIG. 16 is a schematic illustration of a final provisioning state process that may be implemented with the embodiments described herein.

FIG. 16 is a schematic illustration of a final provisioning state process 1600 that may be implemented with the embodiments described herein. In an exemplary embodiment, process 1600 represents a final provisioned state of a managed device according to the systems and methods described herein. As illustrated in FIG. 16, an AWS certificate (e.g., signed device certificate 1602) enables the device to associate to the AWS IoT account of the manufacturer within AWS 414, and ecosystem certificate 1604 enables the device to authenticate itself with its associated ecosystem (OpenADR 216, in this example).

In addition to the several embodiments described above, the present systems and methods may be further implemented with respect to a credentials registration protocol (CDP) format used in the several domains of the process flows illustrated herein, and particularly with respect to production. For example, in an exemplary embodiment, the CDF (e.g., CDF 708) may be configured to make use of a set of Javascript Object Notation (JSON) messages carried over HTTPS. Accordingly, all requests and responses sent over HTTPS by clients and servers are expected to be encoded using the UTF-8 (RFC3629) character set. At present, TLSv1.2 is implemented to avoid possible attacks against older versions of the TLS protocol.

The transfer of information in HTTPS requests may be accomplished by the client sending a sequence of HTTPS JSON-formatted requests to the server by using the POST method. Authentication of the client may then be achieved (i) using an optional client-side certificate, which itself may be registered with the user's account, and (ii) by a secure API key delivered to the client. Client software may then send a "User-Agent" header in accordance with RFC7231, and a "Content-Type" header May be set to "application/json". The "Content-Length" header though, may be set to the size of the body of the request. Binary fields in the JSON objects used by this protocol may, for example, be encoded using base64url encoding described in (e.g., RFC4648, Section 5).

Message authentication may then be executed such that all requests with a non-empty body will authenticate the body of the message (e.g., by using SHA-256 function over the body of the message) and then use the API key to generate a 'Message-Authentication' authentication header according to: (i) the agent calculates the HASH over the message body (as sent by the client) such that H'=HASH (msgBody); and (ii) the agent calculates the HASH over the APIKey concatenated with H' such that H"=HASH (APIKey∥H'). The result therefrom is then base64url encoded and used as the value of the authentication header such that Authentication-Header: base64url(H").

When the request is processed by the server, the value of the authentication header is verified against the body of the HTTP message, the APIKey, and the associated client-certificate (if registered). In case of errors during the authentication of the request, the server responds with HTTP 401 code (Unauthorized).

For request messages, HTTP POST messages may be used to upload information about the issued certificates and the devices/secure elements to which they are associated. The body of the messages, e.g., JSON-encoded, may carry three different sections: (i) the preamble (or headers) that carry information about the context of the certificates/keys; (ii) the data section that carries information about the keys and/or certificates associated with each secure element/device; and (iii) the extensions section which carries additional information about the issuing process (e.g., might not the used in version 1 of the message format).

The request messages should use the following path for registering a new set of credentials:

/provisioning/register

Future version of the protocol might provide different paths for operations other than registration of credentials.

The preamble object may be used to provide information about the vendor, the client, and the batch (if applicable) of issued credentials that are to be registered with the re-provisioning service. The preamble object may, for example, take the following form:

```
{
    version: 1,
    vendorId:
    "...",
    batchId: "...",
    clientId: "...",
    messageId: "...",
    clientDesc: "Example,
    Inc.", clientContact : {
        name: "John Doe",
        email: "j.doe@example.com",
        address: "1234 Main Street, Denver, CO 80502, US"
    },
    notes : "Some special remarks..."
}
```

As illustrated above, the preamble object may contain one or more of the following fields: version; vendorId; batchId; clientId; messageId; clientDesc; and clientContact. The version, for example, may be a required integer value, and represent the version of the supported protocol. The vendorId, for example, may be a required strength, and represent the identifier that was provided together with the API key from the re-provisioning service. In some cases, this field may be considered the equivalent of a user identity. The batchId may be an optional string, and represent the identifier (if applicable) of the batch of credentials that were issued/generated at the vendor's facility. In some cases, multiple messages might refer to the same batchId (i.e., not all the issued credentials from the same batch need to be included in a single message). In contrast, credentials issued under different batches will not be included in the same message.

The clientId may be a required string, and represent a unique identifier for the client that as acquired the secure elements/devices for which the credentials are being registered. This identifier is unique (i.e., the vendor does not use the same identifier for different clients). The messageId may also be a required string, and represent unique identifier for the message itself. This identifier may be used in replies to identify the message to which the reply is being sent. Accordingly, when the client receives a response from the server, the client may use the messageId field carried in the response to tie the response to the request. The clientDesc may be an optional string, and represent a human-readable identifier of the client that has acquired the secure elements/devices for which the credentials are being registered. The content of this field may be used for logging and/or error messages, and does not need to be unique.

The clientContact, on the other hand, may be a required object, and represent a JSON object that describes the main contact for the client that acquired the secure elements/devices for which the credentials are being registered. This object may contain one or more of the following fields: (i) name, which may be a required string that indicates name of the person/department to contact with regard to the registered credentials; (ii) email which may be a required string that indicates the e-mail address of the client that acquired the secure elements/devices for which the credentials are being registered (i.e., should be a valid e-mail and verified by the vendor prior the registration of the credentials); (iii) address, which may be a required string indicating the address of the client for which the credentials are being registered with the re-provisioning service; and (iv) notes, which may be an optional string indicating additional notes related to the credentials listed in the data part of the message. The notes field is meant to be written in a human-readable language and meant for human consumption.

A further element in the JSON message includes the data array. The data array is configured to carry the information about the credentials to be registered. Each element of the data array is considered an "element" object that describes the secure element identifiers, its cryptocapabilities, and the array of credential objects that are to be registered with the reprovisioning service. The credentials may be provided in the form of certificates, public keys, or secret keys.

Furthermore, a "keyAlgor" object may be used to describe the cryptographic parameters required to correctly process the provided credentials. The keyAlgor object parameters may depend on the type of the provided credentials, and used only for the "key" credentials type. The following fields are supported in the keyAlgor object: scheme (text; required), indicating scheme for the provided credentials. Accepted values are "rsa" (for RSA keys), "ec" (for Elliptic-Curve Keys), "ecdh" (for EC-based Diffie-Hellman keys), "symmetric" (for symmetric keys), and "secret" (for passwords or API-type secrets). For the "rsa" scheme, the following additional fields are supported: keyFormat (text; required), indicating the format in which the key has been encoded. Supported values include: "pkcs1" for PKCS#1 encoded keys (RFC 8017); "pkcs8" for PKCS#8 encoded keys (RFC 5958); keyType (text; required), indicating the type of provided key information. The supported values are "publicOnly" for PUBLIC keys only, and "publicAndPrivate" for Public and Private keys.

For the "ec" and "ecdh" schemes, the following additional fields are supported: keyFormat (text; required), indicating the format in which the key has been encoded. The supported values include: "pkcs1" for PKCS#1 encoded keys; "pkcs8" for PKCS#8 encoded keys; "raw" for RAW values of the key (for public key only); keyType (text; required), indicating the type of provided key information (supported values are "publicOnly" for PUBLIC keys only, and "publicAndPrivate" for PUBLIC and PRIVATE keys); and curveName (text; required), indicating the name of the curve used for the public and/or private keys (e.g., the value may be obtained from Appendix A, attached, to provide the named curve).

For the "symmetric" scheme, a supported additional field is encAlgor (text; required), indicating the name of the supported encryption algorithm and mode. Supported values include: "aes-cbc" for AES in CBC mode; "aes-gcm" for AES in GCM mode; "3des" for Triple DES algorithm; and "blowfish" for Blowfish algorithm.

The "secret" scheme may be used for passwords or API secrets, and supports an additional fields of opMode (text; required), indicating the supported mode for the usage of this secret. Supported values include: "hmac-sha1" for HMAC with SHA-1; "hmac-sha256" for HMAC with SHA-256; "hmac-sha384" for HMAC with SHA-384; "hmac-sha512" for HMAC with SHA-512; "raw" for direct use within communication messages; id (text; optional), indicating the identity (username, login, etc.) associated with the provided secret.

An exemplary keyAlgor object for an EC key may be represented as:

```
{
    scheme: "ec",
    curveName:
    "prime256v1",
    keyFormat: "raw",
    keyType: "publicOnly"
}
```

Here's an example for a symmetric key intended to be used for AES in GCM mode:

```
{
    encAlgor: "aes-gcm"
}
```

The credentials object provides a description of the credentials to be registered with the provisioning service for a specific secure element. An examplary credentials object may be represented as:

```
{
    type: "x509cert",
    value:
    "MD3eF...==",
}
```

A supported field for the credentials objects includes type (text; required), indicating the type of provided credentials. Supported values for the type field include: "x509cert", indicating the credentials provided in a X.509 certificate (DER encoded, only the public key is actually processed from the certificate); "x509req", indicating the credentials provided in an PKCD#10 X.509 certificate request (DER encoded, only the public key is actually processed from the certificate request); "key", indicating the credentials provided in the form of cryptographic keys or generic secrets (when this value is used for the type, the keyAlgor object is required is not null); and value (binary; required), indicating the binary data (base64encoded) that carry the value of the credentials to be registered with the system.

An exemplary public key credentials object for an EC may be as follows:

```
{
    type: "key",
    keyAlgor: {
        scheme: "ec",
        curveName:
                "prime256v1",
            keyFormat: "raw",
            keyType: "publicOnly"
    },
    value: "MD32E21...="
}
```

An exemplary credentials object (typical format for OpenSSL's output) for an RSA keypair (public and private) may be represented as:

```
{
    type: "key",
    keyAlgor: {
        scheme: "rsa",
        keyFormat: "pkcs1"
        keyType: "publicAndPrivate"
    },
    value: "REWW45Ty/...."
}
```

Another credentials example may be provided in the form of a PKCS#10 request (since the PKCS#10 request already carries all the required information to correctly process the key material, the keyAlgor object is not required inside the credentials object):

```
{
    type: "x509req",
    value:
        "MD31A+...."
}
```

The element object describes the specific secure element and/or device and carries the information about the credentials to be registered via an array of "credentials" objects (described above). The element object supports the following fields: deviceId (binary; required), indicating a unique identifier (base64encoded) for the secure element and/or device for which the credentials are registered for; deviceModel (text; optional), indicating a description (human-readable) for the model of the device and/or secure element for which the credentials are to be registered for (this field may be used to track the cryptographic capabilities of the secure element and/or device); deviceManufacturer (text; optional), indicating a description (human-readable) of the name of the manufacturer for the secure element for which the credentials are to be registered for (this field might be used to display information to users and for debugging purposes); credentials (array of "credentials" objects; required), indicating a non-empty field of "credentials" objects that carry the information about the credentials to be registered with the system for the specific secure element and/or device; and linkedIds (array of text; optional), indicating an array of linked identities (e.g., when registering credentials that might be related to other secure elements within the same device, this field may be used to link these identities/credentials together).

An exemplary element object that carries two credentials (e.g., a raw EC key and a password) may be represented as follows:

```
{
    deviceId: "EDE3/+...=",
    deviceModel: "EC 508",
    deviceManufacturer:
        "Microchip", credentials: [
        {
            type: "key",
            keyAlgor: {
                scheme: "ec",
                curveName:
                    "prime256v1",
                keyFormat: "raw",
                keyType: "publicOnly"
            },
            value: "MD32E21...="
        },
        {
            type: "key",
            keyAlgor : {
                scheme: "secret"
            }
            value: "3ROP/D6G...."
        }]
}
```

HTTPS responses generated from the server may be JSON formatted. Authentication of the server may be achieved by using a server-side certificate that is valid for the service's URL, and by the API key that the client and server share. The "Content-Type" header should be set to "application/json", and binary fields in the JSON objects used by this protocol are encoded using base64url encoding described in (RFC4648—Section 5).

For response authentication, responses with a non-empty body should carry an authentication header that authenticates the integrity of the body of the message. The authentication may be achieved by using the SHA-256 function over the body of the message, and then use the client's API key to generate the 'Message-Authentication' authentication header described herein. Similar to the steps described above, the agent first calculates the HASH over the message body (as sent by the client) according to H'=HASH(msgBody), and then calculates the HASH over the APIKey concatenated with H' according to H"=HASH(APIKey||H'). The result is then base64url encoded and used as the value of the authentication header:

Message-Authentication: a=SHA-256;v=base64url(H")

When the request is processed by the client, the value of the authentication header may be verified against the body of the HTTP response and the APIKey. In case of authentication error, the response shall be considered invalid and further contacts with the server administrators shall be pursued to verify that the communication with the server is secure.

The body of response messages are JSON encoded and carry three main fields. The first one is the "messageId" of the message to which the response is related to. The second field is the return code that provides information about the status of the processing of the corresponding request. The last field is an array of "error" objects that correspond to the error status of each "element" objects found in the request that was not correctly processed. In case no errors were found during the processing of the request, the "errors" array is empty.

The supported fields in response messages include: messageId (text; required), indicating the message identifier copied directly from the corresponding request; returnCode (text; required), indicating the request processing return code. Supported values for this field are: "OK"—No errors where found while processing the request; "INTERNAL ERROR", indicating the system has encountered internal errors (not related to the request) and cannot process the request at this time; "FORMAT ERROR", indicating the system was not able to correctly parse the received request (not a valid JSON message); "VALIDATION ERROR", indicating the received request message is non-conformant to the specifications of the protocol and was rejected (either missing fields or extra fields were found); "SIZE ERROR", indicating the received request message was either empty (no message body) or it exceeded the maximum allowed length for a request message; "ELEMENT ERROR", indicating one or more errors where found while processing the elements objects (in this case, the response should carry the "error" objects for each of the processing errors inside the "errors" array); "UNKNOWN ERROR", indicating the system incurred into an "unknown" error while processing the request; and errors (array of "error" objects; optional), indicating an array of "error" objects that identify the errors associated with the specific "element" object that caused them.

The error object provides information about the specific error the system encountered while processing the registration for the element. The error object supports the following fields: errorCode (integer; required), indicating the error code related to the issue incurred into while processing the specific "element" object; deviceId (binary; required), indicating the identifier that uniquely points to the "element" object that was not correctly processed; errorParam (text; optional), indicating an identifier that specify the field that caused the error; errorDesc (text; optional), indicating a human-readable description of the error that can be used for debugging and problem fixing.

An exemplary response to a successful registration message may include the following:

```
{
    messageId: "...",
    returnCode:
        "OK", errors: [ ]
}
```

An exemplary response that carries two errors may include the following:

```
{
    messageId: "...",
    returnCode:
    "OK", errors: [
        {
            errorCode: 1,
            deviceId: "3EwA2...=",
            errorParam: "Credentials;2",
            errorDesc: "Unknown Type"
        },
        {
            errorCode: 2,
            deviceId: "98G/eEwP...",
            errorParam: "Credentials;3",
            errorDesc: "Duplicate Credentials"
        }
    ]
}
```

An exemplary full registration request may include the following:

```
POST /provisioning/register
HTTP/1.1 Host:
provisioning.kyrio.com
Message-Authentication: a=SHA-
256;v=43ErREHE...== Content-Type:
application/json
Content-Length: 2304
{
    preamble: {
        version: 1,
        vendorId:
        "...",
        batchId: "...",
        clientId: "...",
        messageId: "...",
        clientDesc: "Example,
    Inc", clientContact: {
            name: "John Doe",
            email: "j.doe@example.com",
            address: "1234 Main Street, Denver, CO 80502, US"
        },
        notes : "Some special remarks..."
    },
    data : [
        {
            deviceId: "EDE3/+...=",
            deviceModel: "EC 508",
            deviceManufacturer: "Microchip",
            credentials: [
                {
                    type: "key",
                    keyAlgor: {
                        scheme: "ec",
                        curveName: "prime256v1",
                        keyFormat: "raw",
                        keyType: "publicOnly"
                    },
                    value: "MD32E21...="
                },
                {
                    type: "key",
                    keyAlgor : {
                        scheme: "secret"
                    }
                    value: "3ROP/D6G...."
                }]
        }
    ]
}
```

An exemplary full registration response may include the following:

```
HTTP/1.1 200 OK
Date: Wed, 27 Sep 2017 17:43:53 GMT
Server: Apache/2.2.14 (Win32)
Last-Modified: Wed, 27 Sep 2017 17:43:53 GMT
Content-Length: 354
Message-Authentication: a=SHA-256;v=43R3NMte39O+...
Content-Type: application/json
```

```
-continued

Connection: Closed
{
  messageId: "",
  returnCode: "OK",
  errors: [
    {
      errorCode: 3,
      deviceId: "3EwA2...=",
      errorParam: "Credentials/2/keyAlgor/scheme",
      errorDesc: "Unknown Algorithm"
    },
    {
      errorCode: 2,
      deviceId: "98G/eEwP...",
      errorParam: "Credentials/3/value",
      errorDesc: "Duplicate Credentials"
    }
  ]
}
```

The following is the list of supported error codes and their definition for CDP responses (element objects processing error codes) according to Value/Description: 1/Wrong field type (type differs from the expected one); 2/Missing (or empty) required field; 3/Unknown or not-supported value for the field; 4/Duplicate value.

As part of secure element production and initialization, an important aspect is to be able to register the secure elements credentials that can then be used to re-provision elements both at the factory where the secure element is integrated in a larger device or in the field directly. In order to be able to correctly identify secure elements and devices, there is the need for a description language and protocol that allows for credentials issued or generated at the secure elements' factory to be securely registered and made available for the re-provisioning service.

Credentials Description Language (or CDL) is a described set of rules for the formatting and encoding of credentials messages is aimed at providing standardized and verifiable messages that can be generated by the manufacturer of the secure elements and can be easily used to register the elements with the re-provisioning service. CDL messages may then be used to automatically upload them to the re-provisioning service. Support for the Credentials Registration Protocol (CDR) is encouraged for organizations that might have an ongoing business relationship with the re-provisioning service and would like to automate the handling of the credentials information.

The Credentials Description Language use Javascript Object Notation (JSON) objects to describe the credentials associated with secure elements, devices, or software packages. The file format is meant to be able to accommodate different types of credentials and cryptographic algorithms.

The data encoding should be encoded using the UTF-8 (RFC3629) character set. Binary fields in the JSON objects used by this format should be encoded using base64url encoding described in (RFC4648—Section 5). Given the potential large size of each CDL document, the authentication of the data may be performed by generating a PKCS#7 or CMS detached signature on the CDL file.

The signature should include all certificates required to verify the correctness of the signature up to the root Trust Anchor. Optionally, the signature might include revocation information for the certificates in the certificate chain (i.e., CRLs). The manufacturer might decide to use an internal CA, an external CA (e.g., a public CA or a CA run by the re-provisioning service), or a self-signed certificate for the signing operation. The signing certificate MUST include (a) the legalName in the Common Name (CN) of the subject of the certificate (must match the content of the "legalName" in the manufacturer object) and (b) the manufacturer's contact e-mail address (MUST match the contents of the "email" field in the manufacture's contacts object).

The relying party that is going to verify the signature should verify that the certificate used is the one supported by the manufacturer and that the fields listed above match the contents of the signing certificate. The message authentication file shall be encoded in PEM format and is required to authenticate the authorship of the document (the manufacturer), the client, and the integrity of the data itself.

The CDL JSON object supports three different fields: the preamble (object) field, the data (array of "element" objects) field, and the extensions (array of "extension" objects) field. The "preamble" object is used to describe the details related to the batch (or reel) manufacturer, the client who purchased the devices, and their contacts. The "data" array field provides information about the identification and credentials associated with each element that is to be registered with the reprovisioning service. Each element is registered The preamble object provides information about the vendor, the client, and the batch/reel (if applicable) of issued credentials that need to be registered with the re-provisioning service. An exemplary preamble object may include:

```
{
  version: 1,
  batchId: "",
  messageId:
  "",
  manufacturer
  : {
    taxId : "",
    legalName : "",
    contacts : {
      name : "Jane Doe",
      email : "jane.doe@example.com",
      phone : "+1 555-555-5555",
      address : "Example HQ, Denver, CO, US"
    }
  }
  client: {
    taxId : "...",
    legalName : "Example, Inc.",
    contacts : {
      name : "John Doe",
      email :
      "j.doe@example.com",
      phone : "+1 555-555-5555",
      address : "1 Main St, Denver, CO 80502, US"
    }
  }
  notes : "Some special remarks..."
}
```

The preamble object contains the following fields: version (integer; required), indicating a version of the supported protocol; batchId (string; optional), indicating the identifier (if applicable) of the batch of credentials that were issued/generated at the vendor's facility; messageId (string; required), indicating a unique identifier for the message itself (this identifier may be used in replies to identify the message being replied to, and the messageId is unique for each "batchId," as long as the "messageId" field is not repeated, to make sure that elements are not registered more than once); manufacturer (object; required), indicating the manufacturer of the set of elements for which the credentials are to be registered. The object supports the following fields: taxId (string; required), indicating the tax identification number of the client (if not available, the entry should be set to the special value "000000000" (9 zeroes)); legalName (string; required), indicating the name of the person/department to contact with regards of the registered credentials; contacts (object; required), indicating a JSON object that describes the main contact for the manufacturer of the elements for which the credentials are being registered. This object contains the following fields: name (string; required), indicating the name of the person/department to contact with regards of the registered credentials; email (string; required), indicating the e-mail address of the manufacturer; phoneNumber (string; required), indicating the phone number of the client that can be used for any business related calls; address (string; required), indicating the address of the client for which the credentials are being registered with the re-provisioning service; client (object; required), indicating the client who purchased the set of elements for which the credentials are to be registered; clientDesc (string; optional), indicating a human-readable identifier of the client that acquired the secure elements/devices for which the credentials are being registered; notes (string; optional), additional notes related to the credentials listed in the data part of the message.

The next element in the JSON message is the data array. The array carries the information about the credentials to be registered. Each element of the array is an "element" object that describes the secure element identifier(s), its details, and the array of credentials objects that are to be registered with the reprovisioning service.

The credentials can be provided in the form of certificates, certificates requests, public/private keys, or secret keys. If the credentials are provided as keys (any type), the "keyAlgor" object is used inside the "credentials" object to describe the keys' properties.

The "keyAlgor" object is used to describe the cryptographic parameters required to correctly process the provided credentials. The algor object's parameter depend on the type of the provided credentials and it is used only for the "key" credentials type. The following fields are supported in the keyAlgor object:

scheme (text; required)—The scheme for the provided credentials. Accepted values are "rsa" (for RSA keys), "ec" (for Elliptic-Curve Keys), "ecdh" (for EC-based Diffie-Hellman keys), "symmetric" (for symmetric keys), and "secret" (for passwords or API-type secrets)

The "rsa" scheme. For "rsa" scheme, the following additional fields are supported:

keyFormat (text; required)—The format in which the key has been encoded. The supported values are:

"pkcs1" for PKCS#1 encoded keys (RFC 8017)

"pkcs8" for PKCS#8 unencrypted encoded keys (RFC 5958)

"pKeyInfo" for SubjectPublicKeyInfo (publicOnly type) encoded keys (RFC 5280—4.1.2.7)

keyType (text; required)—The type of provided key information. The supported values are:

"publicOnly" for PUBLIC keys only

"publicAndPrivate" for Public and Private keys

The "ec" and "ecdh" scheme. For "ec" and "ecdh" schemes, the following additional fields are supported:

keyFormat (text; required)—The format in which the key has been encoded. The supported values are:

"pkcs1" for PKCS#1 encoded keys

"pkcs8" for PKCS#8 encoded keys

"pKeyInfo" for SubjectPublicKeyInfo (publicOnly type) encoded keys (RFC 5280—4.1.2.7)

"raw" for RAW values of the key (for public key only)

keyType (text; required)—The type of provided key information. The supported values are:

"publicOnly" for PUBLIC keys only

"publicAndPrivate" for PUBLIC and PRIVATE keys curveName (text; required)—The name of the curve used for the public and/or private keys. The value should use the table in Appendix A to provide the named curve. As an alternative, the curveName value can carry the "OID:" prefix followed by the dotted representation of the Object Identifier related to the specified named curve.

The "symmetric" scheme. For the "symmetric" scheme, the supported additional fields are:

encAlgor (text; required)—The name of the supported encryption algorithm and mode. Supported values are:

"aes-cbc" for AES in CBC mode

"aes-gcm" for AES in GCM mode

"3des" for Triple DES algorithm

"blowfish" for Blowfish algorithm

The "secret" scheme. The "secret" scheme is used for passwords or API secrets, and supports the following additional fields:

opMode (text; required)—The supported mode for the usage of this secret. Supported values are:

"hmac-sha1" for HMAC with SHA-1

"hmac-sha256" for HMAC with SHA-256

"hmac-sha384" for HMAC with SHA-384

"hmac-sha512" for HMAC with SHA-512

"raw" for direct use within communication messages id (text; optional)—The identity (username, login, etc.) associated with the provided secret.

An example of a keyAlgor object for an EC key:

```
{
    scheme: "ec",
    curveName: "prime256v1",
    keyFormat: "raw",
    keyType: "publicOnly"
}
```

The same example with the only difference that the "curveName" parameter uses the OID of the curve instead of its name:

```
{
    scheme: "ec",
    curveName: "1.2.840.10045.3.1.7",
    keyFormat: "raw",
    keyType: "publicOnly"
}
```

An example for a symmetric key intended to be used for AES in GCM mode:

```
{   encAlgor: "aes-gcm"   }
```

The credentials object provides a description of the credentials to be registered with the provisioning service for a specific secure element. Here's an example of a credentials object:

```
{
  type: "x509cert",
  value: "MD3eF=="
}
```

The supported fields for the credentials objects are as follows: type (text; required)—The type of provided credentials. The supported value for this field are: "x509cert"—The credentials are provided in a X509 certificate (DER encoded); Only the public key is actually processed from the certificate; "x509req"—The credentials are provided in an PKCD#10 X.509 certificate request (DER encoded). Only the public key is actually processed from the certificate request; "key"—The credentials are provided in the form of cryptographic keys or generic secrets. When this value is used for the type, the keyAlgor object is required and MUST NOT be null; value (binary; required)—The binary data (base64url encoded) that carry the value of the credentials to be registered with the system.

An example for an EC public key credentials object:

```
{
  type: "key",
  keyAlgor: {
    scheme: "ec",
    curveName: "prime256v1",
    keyFormat: "raw",
    keyType: "publicOnly"
  },
  value: "MD32E21="
}
```

Here's an example for a RSA keypair (public and private) credentials object (typical format for OpenSSL's output):

```
{
  type: "key",
  keyAlgor: {
    scheme: "rsa",
    keyFormat: "pkcs1"
    keyType: "publicAndPrivate"
  },
  value: "REWW45Ty/...."
}
```

The last example is for credentials provided in the form of a PKCS#10 request (notice that since the PKCS#10 request already carries all the required information to correctly process the key material, the keyAlgo object is not required inside the credentials one:

```
{
  type: "x509req",
  value: "MD31A+...."
}
```

The element object describes the specific secure element and/or device and carries the information about the credentials to be registered via an array of "credentials" objects (described above). The element object supports the following fields: elementId (binary; required)—A unique identifier (base64url encoded) for the secure element and/or device for which the credentials are registered for; elementModel (text; optional)—A description (human readable) for the model of the device and/or secure element for which the credentials are to be registered for. This field will be used to track the cryptographic capabilities of the secure element and/or device; credentials (array of "credentials" objects; required)—A non-empty field of "credentials" objects that carry the information about the credentials to be registered with the system for the specific secure element and/or device; linkedIds (array of text; optional)—An array of linked identities. For example, when registering credentials that might be related to other secure elements within the same device, this field may be used to link these identities/credentials together.

An example of an element object that carries two credentials (a raw EC key and a password):

```
{
  elementId: "EDE3/+...=",
  elementModel: "EC 508",
  credentials: [
    {
      type: "key",
      keyAlgor: {
        scheme: "ec",
        curveName: "prime256v1",
        keyFormat: "raw",
        keyType: "publicOnly"
      },
      value: "MD32E21="
    },
    {
      type: "key",
      keyAlgor : {
        scheme: "secret"
      }
      value: "3ROP/D6G...."
    }]
}
```

The Credentials Registration Protocol makes use of a set of Credentials Description Language (CDL) Javascript Object Notation (JSON) messages carried over HTTPS. All requests and responses sent via HTTPS by clients and servers MUST be encoded, as describe in the previous section, using the UTF-8 [RFC3629] character set. In order to avoid possible attacks against older version of the TLS protocol, currently, the only supported one is TLSv1.2.

The transfer of information is accomplished by the client sending a sequence of HTTPS JSON-formatted requests to the server by using the POST method. Authentication of the client is achieved by using a client-side certificate (optional) that needs to be registered with the user's account, and by an API key that is delivered to the client by the reprovisioning service and must be secured.

The "Message-Authentication" header (described in the next section) MUST be used to authenticate the message body.

Client software MUST use a "User-Agent" header in accordance to [RFC7231]. The "Content-Type" header MUST be set to "application/json".

The "Content-Length" header MUST be set to the size of the body of the request.

Binary fields in the JSON objects used by this protocol are encoded using base64url encoding described in [RFC4648—Section 5].

All HTTP messages (i.e., requests and responses) with a non-empty body MUST authenticate the body of the message by using SHA-256 function over the body of the message and then use the API key to generate the 'Message-Authentication' authentication header as follows.

First the agent calculates the HASH over the message body (as sent by the client):

H'=HASH(msgBody)

Then the agent calculates the HASH over the APIKey concatenated with H':

H"=HASH(APIKey||H')

The result is then base64url encoded and used as the value of the authentication header:

Message-Authentication: base64url(H")

When the request is processed by the server, the value of the authentication header is verified against the body of the HTTP message, the APIKey, and the associated client-certificate (if registered).

In case of errors during the authentication of the request, the server responds with HTTP 401 code (Unauthorized).

HTTP POST messages are used to upload information about the credentials and the elements they are associated to. The body of the messages carry a CDL message that MUST follow the format and encoding rules described in Section 3 of this document.

Request messages should use the following path for registering a new set of credentials:

/credentials/register

Future version of the protocol might provide different paths for operations other than registration of credentials.

Responses generated from the server are also be JSON formatted. Authentication of the server is achieved by using a server-side certificate (mandatory) that is valid for the service's URL, and by the API key that client and server share.

The "Message-Authentication" header (described in the Section 4.2) MUST be used to authenticate the message body. In case of authentication error, the response shall be considered invalid and further contacts with the server administrators shall be pursued to verify that the communication with the server is secure. The "Content-Type" header should be set to "application/json".

The body of response messages are JSON encoded and carry three main fields. The first one is the "messagId" of the message to which the response is related to. The second field is the return code that provides information about the status of the processing of the corresponding request. The last field is an array of "error" objects that correspond to the error status of each "element" objects found in the request that was not correctly processed. In case no errors were found during the processing of the request, the "errors" array is empty.

The supported fields in response messages are: messageId (text; required)—The message identifier copied directly from the corresponding request; returnCode (text; required)—The request processing return code.

Supported values for this field are: "OK"—No errors where found while processing the request; "INTERNAL ERROR"—The system has encountered internal errors (not related to the request) and can not process the request at this time; "FORMAT ERROR"—The system was not able to correctly parse the received request (not a valid JSON message); "VALIDATION ERROR"—The received request message is non-conformat to the specifications of the protocol and was rejected (either missing fields or extra fields were found); "SIZE ERROR"—The received request message was either empty (no message body) or it exceeded the maximum allowed length for a request message; "ELEMENT ERROR"—One or more errors where found while processing the elements objects; "UNKNOWN ERROR"—The system incurred into an "unknown" error while processing the request; errors (array of "error" objects; optional)—Array of "error" objects that identify the errors associated with the specific "element" object that caused them.

The error object provides information about the specific error the system encountered while processing the registration for the element. The error object supports the following fields: errorCode (integer; required)—The error code related to the issue incurred into while processing the specific "element" object. The list of supported "errorCode" values is provided in Appendix B; elementId (binary; required)—The identifier that uniquely points to the "element" object that was not correctly processed; errorParam (text; optional)—An identifier that specify the field that caused the error; errorDesc (text; optional)—A human-readable description of the error that can be used for debugging and problem fixing.

An exemplary response to a successful registration message May appear as follows:

```
{
    messageId: "",
    returnCode: "OK",
    errors: [ ]
}
```

An exemplary response carrying two errors may appear as follows:

```
{
    messageId: "",
    returnCode: "OK",
    errors: [
        {
            errorCode: 1,
            elementId: "3EwA2...=",
            errorParam: "Credentials;2",
            errorDesc: "Unknown Type"
        },
        {
            errorCode: 2,
            elementId: "98G/eEwP...",
            errorParam: "Credentials;3",
            errorDesc: "Duplicate Credentials"
        }
    ]
}
```

An exemplary full registration request may include:

```
POST /provisioning/register HTTP/1.1
Host: provisioning.kyrio.com
Message-Authentication: a=SHA-256;v=43ErREHE...==
Content-Type: application/json
Content-Length: 2304
{
    preamble: {
        version: 1,
        batchId: "...",
        messageId: "...",
        manufacturer: {
            taxId : "...",
            legalName : "...",
            contacts : {
                name : "Jane Doe",
                email : "jane.doe@example.com",
                phone : "+1 555-555-5555",
                address : "Example HQ, Denver, CO, US"
            }
```

```
},
client: {
  taxId : "...",
  legalName : "Example, Inc.",
  contacts : {
    name : "John Doe",
    email : "j.doe@example.com",
    phone : "+1 555-555-5555",
    address : "1 Main St, Denver, CO 80502, US"
  }
},
notes : "Some special remarks..."
},
data : [
  {
    elementId: "EDE3/+=",
    elementModel: "EC 508",
    credentials: [
      {
        type: "key",
        keyAlgor: {
          scheme: "ec",
          curveName: "prime256v1",
          keyFormat: "raw",
          keyType: "publicOnly"
        },
        value: "MD32E21="
      },
      {
        type: "key",
        keyAlgor: {
          scheme: "secret"
        },
        value: "3ROP/D6G...."
      }
    ]
  }
]
}
```

An exemplary full registration response may include:

```
HTTP/1.1 200 OK
Date: Wed, 27 Sep 2017 17:43:53 GMT
Server: Apache/2.2.14 (Win32)
Last-Modified: Wed, 27 Sep 2017 17:43:53 GMT
Content-Length: 354
Message-Authentication: a=SHA-256;v=43R3NMte39O+...
Content-Type: application/json
Connection: Closed
{
  messageId: "",
  returnCode: "OK",
  errors: [
    {
      errorCode: 3,
      elementId: "3EwA2...=",
      errorParam: "Credentials/2/keyAlgor/scheme",
      errorDesc: "Unknown Algorithm"
    },
    {
      errorCode: 2,
      elementId: "98G/eEwP...",
      errorParam: "Credentials/3/value",
      errorDesc: "Duplicate Credentials"
    }
  ]
}
```

Figure 17:
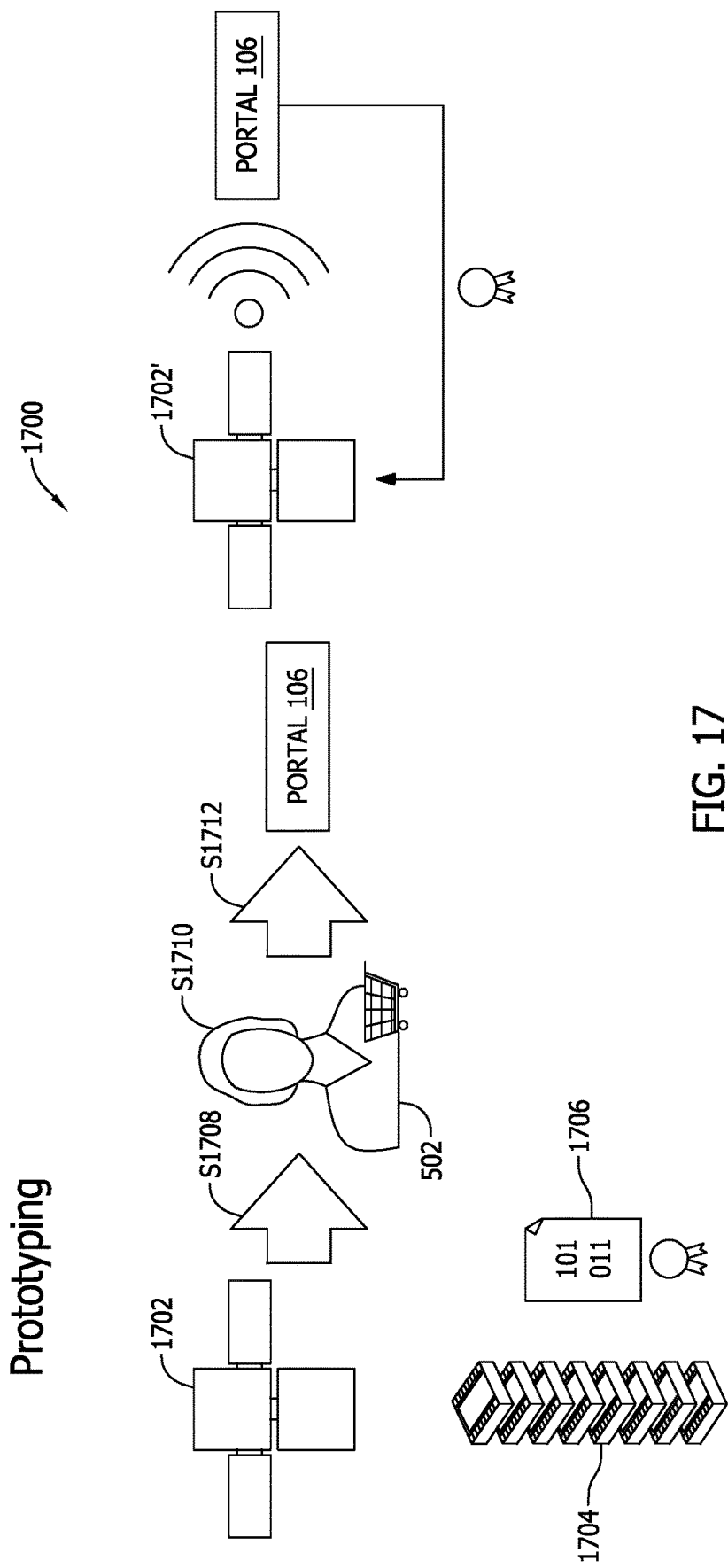
FIG. 17 is a schematic illustration of an alternative development provisioning process that may be implemented with the embodiments described herein.

FIG. 17 is a schematic illustration of an alternative development provisioning process 1700 that may be implemented with the embodiments described herein. In an exemplary embodiment, process 1700 represents a prototyping operation that may be implemented in a complementary fashion, for example, with usage and authentication process 500, FIG. 5. More particularly, evaluation kits 1702 are manufactured with small outline integrated circuits (SOIC) sockets. The evaluation kits 1702 are outfitted S1705 with sample chips 1704 with bootstrap certificates and evaluation kit certificate data file (CDF) 1706. A user 502 may then purchase S1710 the outfitted evaluation kits 1702. The user 502 is enabled to, in step S1715, create an individual user portal account with portal 106. In some embodiments, the user creates an individual AWS IoT account, for AWS 414 (shown in FIG. 4). The user 502 uploads the evaluation kit CDF 1704 and selects the device "ecosystem."

Subsequently, in step S1720, the portal 106 communicates with the purchased evaluation kit 1702 to authenticate the bootstraps certificates. The development PKI of manufacturer 104 (shown in FIG. 1) may then create a development certificate, and provision the evaluation kit 1702 with the development certificate. In some embodiments, the portal 106 also provisions the evaluation kit 1702 with an AWS cert or other cert. In some embodiments, developer certificates (and other certificates) for devices under development may fall under the manufacturer's development PKI, and therefore be configured to have limited lifetimes.

Once the evaluation kit 1702 is power-cycled, the evaluation kit 1702 is enabled to connect with AWS 414 and associate with the AWS IoT account (e.g., created in step S1715), instead of manufacturer AWS demo account 506 (shown in FIG. 5). Process 1700 may be further implemented by the device manufacturer (e.g., user 502) for other devices under development as well.

Figure 18:
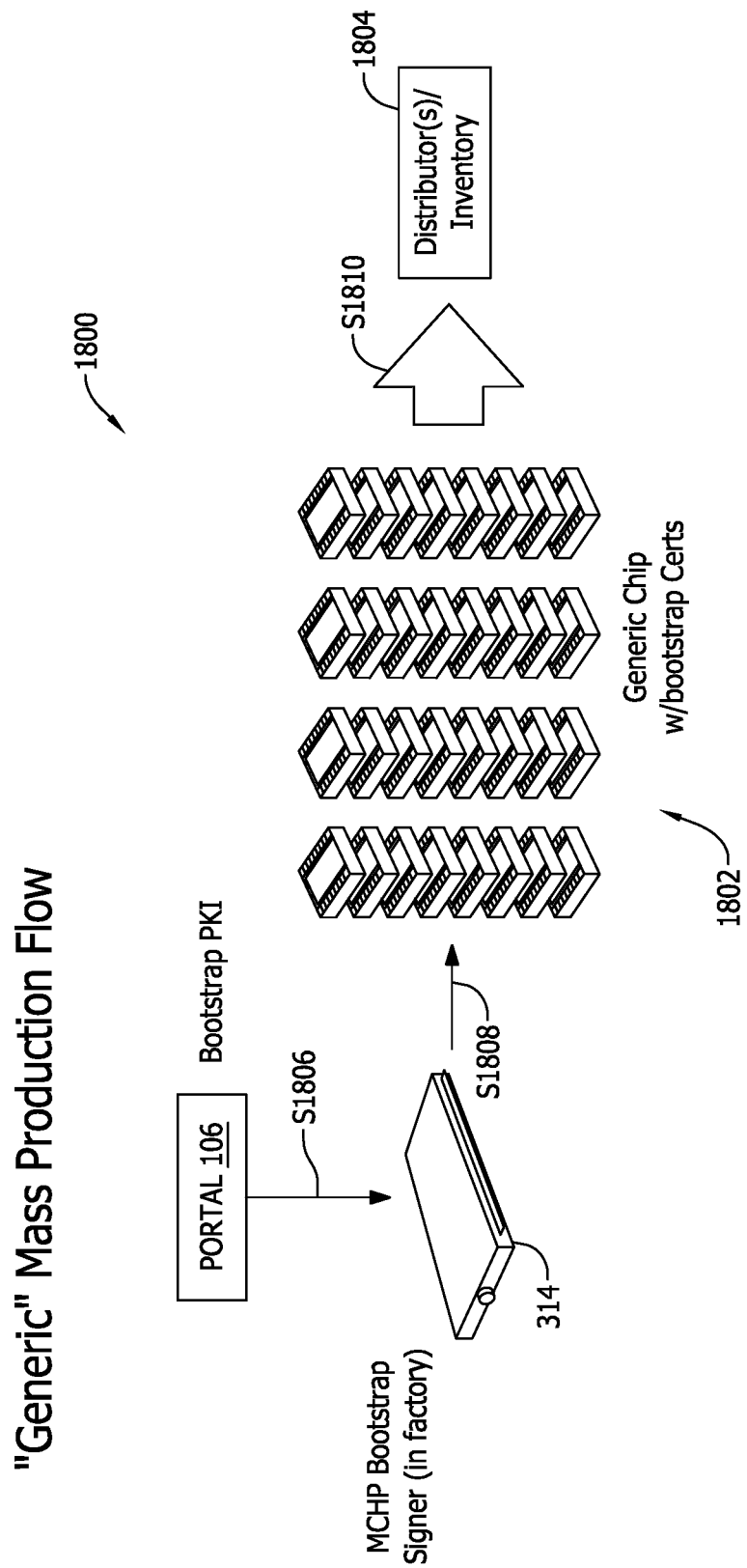
FIG. 18 is a schematic illustration of a mass production process that may be implemented with the embodiments described herein.

FIG. 18 is a schematic illustration of a mass production process 1800 that may be implemented with the embodiments described herein. In an exemplary embodiment, process 1800 represents a manufacturing/production operation that may be implemented as a part of the bootstrap PKI domain 308 (shown in FIG. 3).

In the Bootstrap PKI domain 308 and process 1800, the portal 106 generates S1805 bootstrap certificates for use in, for example, secure element chips 1802 of generic production parts 312 (shown in FIG. 3). In the exemplary embodiment, the secure element chips 1802 are generic secure chips with elliptic curve cryptography, such as, but not limited to, ECCx08A chips, which include authenticator and cipher based on ECDSA and ECDH elliptic curve asymmetric algorithms, with 256-bit keys. The manufacturer bootstrap signer 314 signs S1810 the certificates loaded on the secure element chips 1802. The secure element chips 1802 are then shipped S1815 to distributors 1804.

Figure 19:
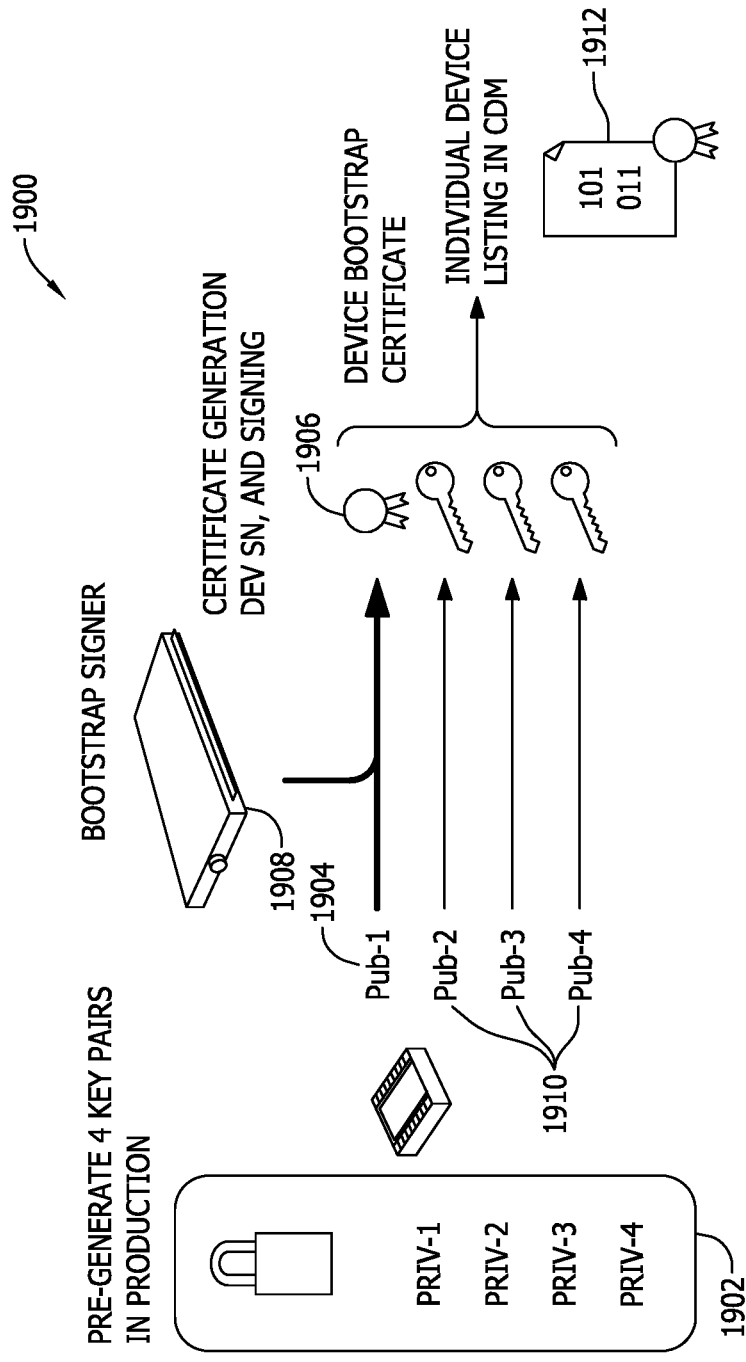
FIG. 19 is a schematic illustration of a production key generation process that may be implemented with the embodiments described herein.

FIG. 19 is a schematic illustration of a production key generation process 1900 that may be implemented with the embodiments described herein. In an exemplary embodiment, during production, each chip 1802 is configured to perform a pre-generation subprocess 1902 to generate 4 key pairs during testing. A first generated key 1904 is used to construct bootstrap certificate 1906 with bootstrap signer 1908. Other pre-generated keys 1910 are sent, along with bootstrap certificate 1906, to portal 106 for use in ecosystem certificates to be created by portal 106. In some embodiments, the device bootstrap certificate 1906, the serial number of the chip 1802, and the public keys 1910 are logged into a certificate data manager (CDM) 1912 that is provided to track a plurality of chips 1802.

Figure 20:
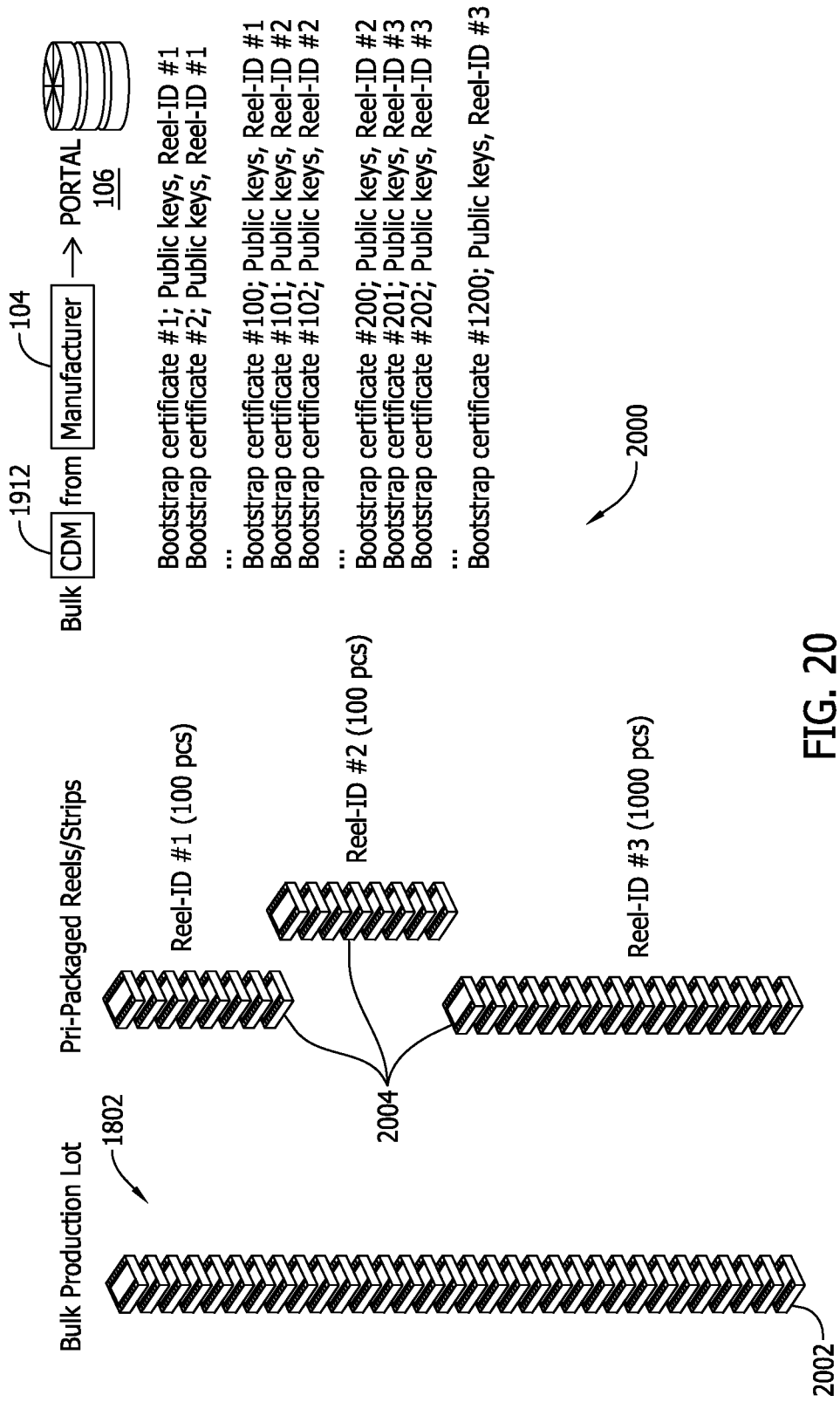
FIG. 20 is an illustration of an exemplary block diagram for a certificate data manager such as shown in FIG. 19.

FIG. 20 is an illustration of an exemplary block diagram for a certificate data manager 1912 (shown in FIG. 19). FIGS. 18 and 19 illustrate the production flow of chips 1802. In the exemplary embodiment, the chips 1802 are produced in bulk, where each chip 1802 is associated with its own bootstrap certificate 1906 (shown in FIG. 19). Manufacturer 104 produced a bulk production lot 2002 of signed chips 1802. The bulk production lot 2002 is broken up into smaller lots 2004 (also known as reels or strips) of chips 1802. Lots 2004 can be any size as appropriate, but for the purposes of this discussion, lots 2004 will be sets of 100, 500, or 1000 chips 1802. Each lot 2004 is assigned an identifier by the manufacturer 104 (shown FIG. 1).

The manufacturer 104 assigns each chip 1802 to a lot 2004. Then the manufacturer 104 generates a CDM 1912 that is transmitted to the portal 106. In some embodiments, the CDM 1912 includes all of the chips 1802 in the bulk production lot 2002. In other embodiments, the CDM 1912 includes all of the chips 1802 in a single lot 2004. In the exemplary embodiment, the CDM 1912 includes a listing for each chip 1802. The listing may include, but is not limited to, the bootstrap certificate 1906 for the chip 1802, the public keys 1910 for the chip 1802, and the lot (or reel) identifier that the chip 1802 is a part of. At this point, the chips 1802 and bootstrap certificates 1906 are only associated with the chips, and are not yet associated with a customer.

Figure 21:
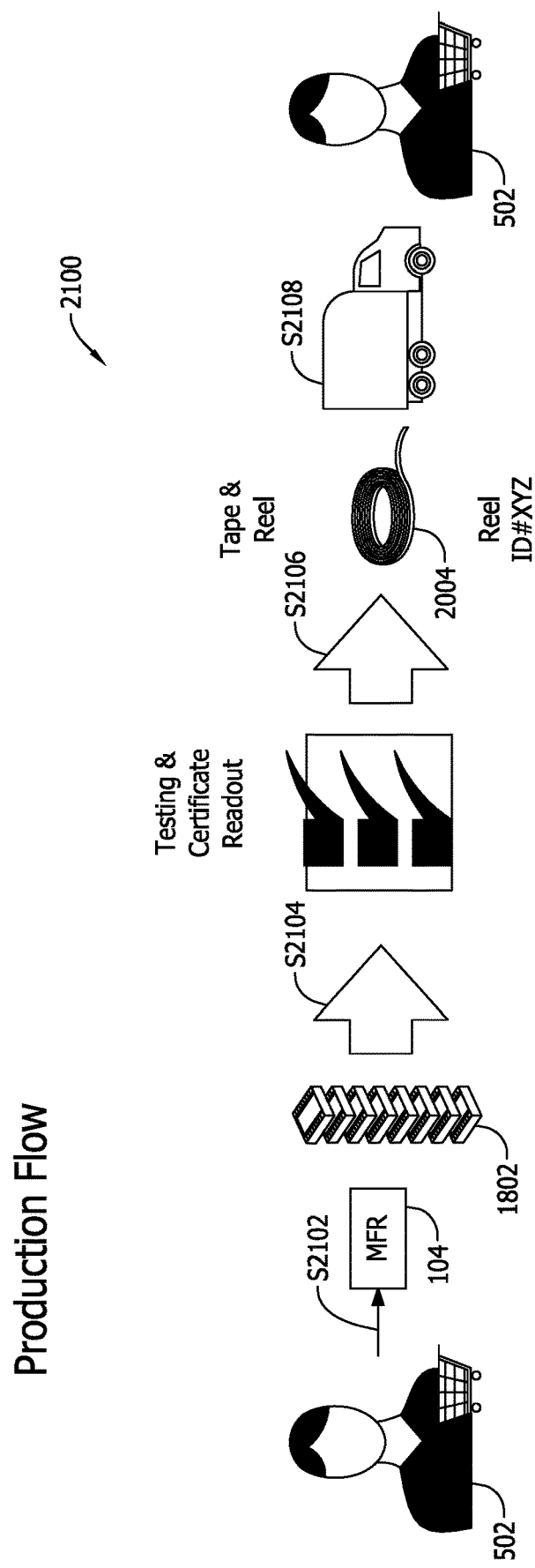
FIG. 21 is a schematic illustration of a production flow process that may be implemented with the embodiments described herein.

FIG. 21 is a schematic illustration of a production flow process 2100 that may be implemented with the embodiments described herein. In the exemplary embodiment, the customer 502 places an order S21025 for a reel 2004 of chips 1802 from manufacturer 104. In the exemplary embodiment, the reel 2004 of chips 1802 is for a lot of chips 1802, such as 100, 500, or 1000. The manufacturer 104 manufactures and tests S2110 the chips 1802. The manufacturer 104 also generates S2115 bootstrap certificate 1906 for each chip 1802 in the reel 2004. In some embodiments, the manufacturer 104 manufactures S2110 to order. In other embodiments, the manufacturer 104 has a stock of reels 2004 of chips 1802 and fulfills the customer's order with stock on hand. The reel 2004 of chips is then shipped S2120 to the customer 502.

Figure 22:
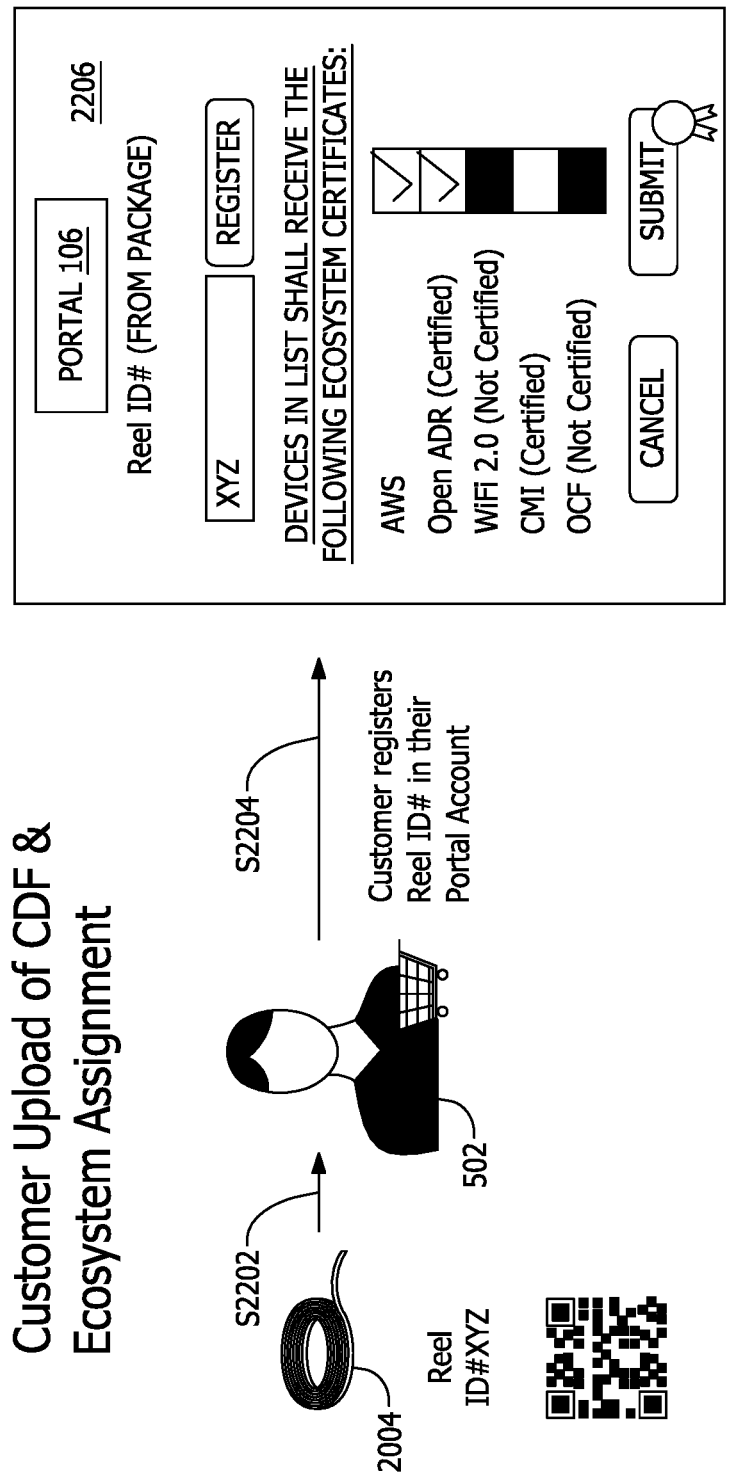
FIG. 22 is a schematic illustration of a customer provisioning process that may coincide with the production flow process shown in FIG. 21.

FIG. 22 is a schematic illustration of a customer provisioning process 2200 that may coincide with production flow process 2100 (shown in FIG. 21). In exemplary operation of customer provisioning process 2200, user 502, in step S2205, receives a reel 2004 of chips 1812 (shown in FIG. 18). The reel 2004 includes a reel ID, which could be on a label or in a bar code. The customer 502 registers S2210 the reel ID with the customer's own user portal account within portal 106 (e.g., under an order certificates page/webpage 2202). Through a user interface (not shown in FIG. 22) accessing page 2202, user 502 is enabled to indicate what ecosystem certificates are to be associated with the list of parts associated with that reel 2004. In at least one embodiment, portal 106 may then count the number of devices in the reel 2004, and calculate the per-certificate fees (if any) when user 502 places an order from page 2202. In some cases, the user AWS IoT certificate will not generate a separate fee. In other cases, the customer AWS IoT certificate is subject to a tiered the structure.

In the exemplary embodiment, the portal 106 performs a lookup on the provided reel identifier to determine the CDM 1912 (shown in FIG. 19) associated with that identifier. The portal 106 then associates that CDM 1912 with the customer's portal account. In the exemplary embodiment, the portal 106 associates the bootstrap certificates 1906 and the public keys 1910 (both shown in FIG. 19) for the chips 1802 in the identified reel 2004. In some embodiments, the portal 106 keeps a list containing the unassigned device and looks in that list for the provided reel identifier.

Figure 23:
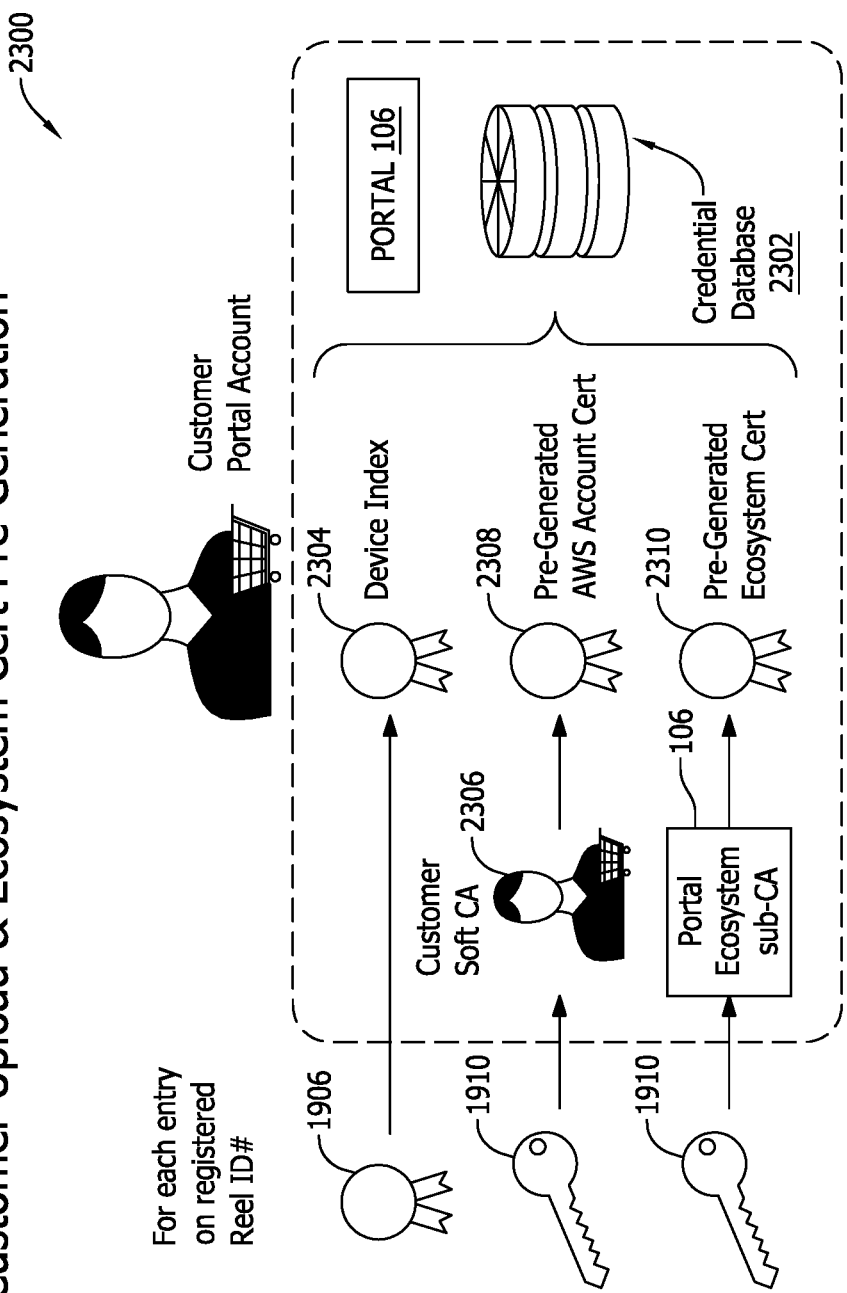
FIG. 23 is a schematic illustration of a certificate pre-generation process that may coincide with the customer provisioning process shown in FIG. 22.

FIG. 23 is a schematic illustration of a certificate pre-generation process 2300 that may coincide with customer provisioning process 2200 (shown in FIG. 22). In the exemplary embodiment, portal 106 includes a credential database 2302. In an exemplary embodiment of certificate pre-generation process 2300, the backend of portal 106 may be configured to automatically know the appropriate ecosystem with which to associate the chips 1812 (shown in FIG. 18), as well as the particular ecosystem certificates that are required. Process 2300 may occur, for example, when a customer (e.g., user 502) uploads the reel identifier from a received reel 2004 (shown in FIG. 20). Upon uploading, each device certificate 1906 (shown in FIG. 19) may be logged as the device index 2304. In this example, because CDM 1912 includes extra public keys 1910 associated with the bootstrap certificate 1906 (both shown in FIG. 19), portal customer CAs 2308 may be further configured to pre-generate AWS account certificates 2306. The portal 106 may be configured to pre-generate ecosystem certificates 2310 when, for example, the respective devices contact/communicate with portal 106. In the exemplary embodiment, the device index 2304, the AWS account certificates 2306, and the ecosystem certificates 2310 are stored in the credential database 2302.

Figure 24:
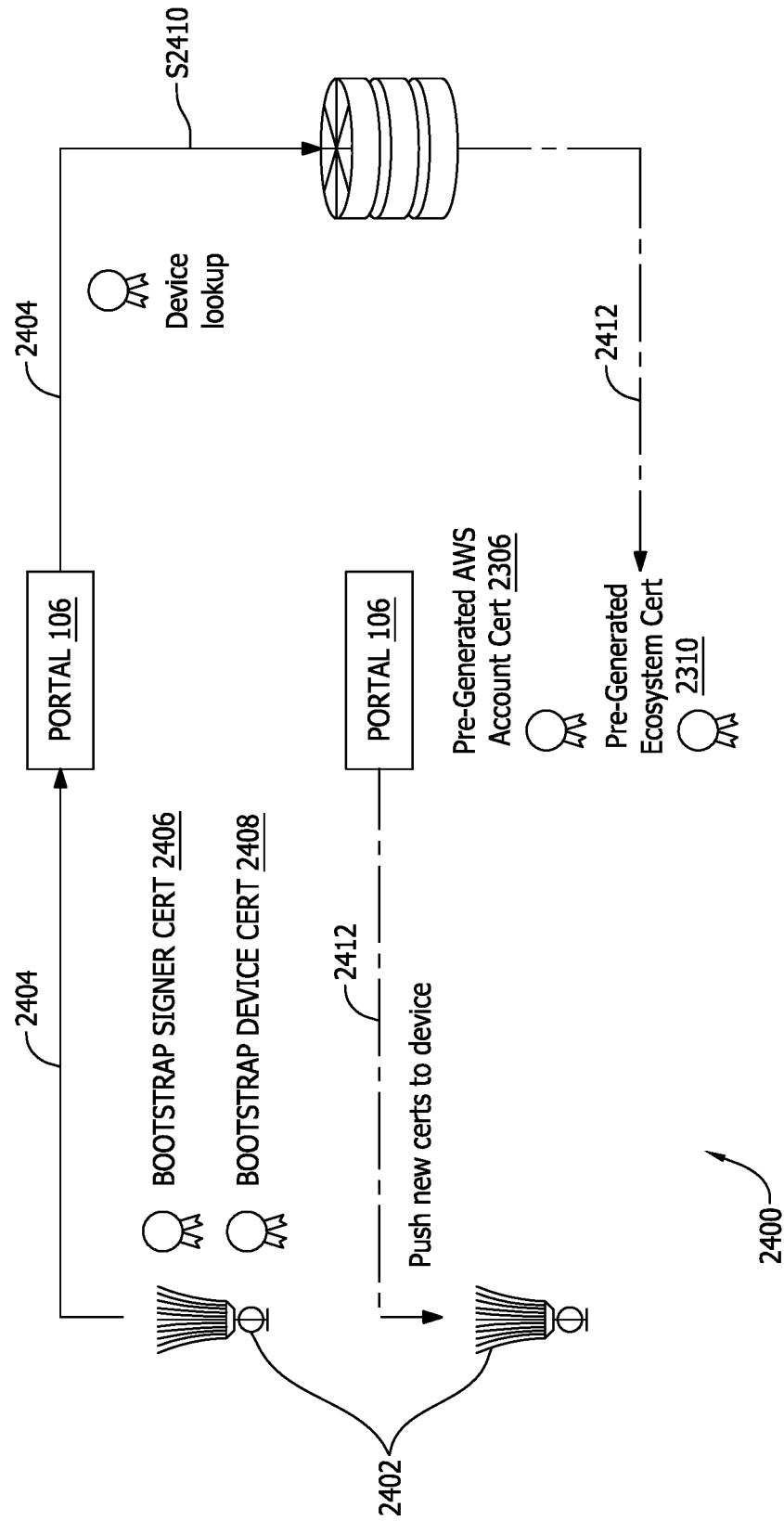
FIG. 24 is a schematic illustration of a field provisioning process that may coincide with the certificate pre-generation process shown in FIG. 23.

FIG. 24 is a schematic illustration of a field provisioning process 2400 that may coincide with certificate pre-generation process 2300 (shown in FIG. 23). In an exemplary embodiment, field provisioning process 2400 may be configured to automatically execute when a device 2402 first powers on in the field. In a first subprocess 2404, when device 2402 first connects to the Internet, device 2402 may be programmed to additionally automatically contact the bootstrap server of portal 106. At this point, the device 2402 includes a bootstrap signer cert 2406 and a bootstrap device cert 2408. The device 2402 transmits 2404 the bootstrap signer cert 2406 and the bootstrap device cert 2408 to the portal 106 for validation.

The bootstrap server of portal 106 may then look up the certificates associated the device 2402, such as in the credentials database 2302. In some embodiments, the portal 106 uses the device cert 2408 as an index to lookup the customer account association and the corresponding ecosystem certificates. In some other embodiments, the portal 106 uses the bootstrap signer cert 2406 to look up the device 2402. Since each bootstrap certificate is associated with a specific device and key sets, the portal 106 can look up exactly which pre-generated certificates are the correct ones to retrieve. The portal 106 retrieves pre-generated AWS account certificates 2306 and pre-generated ecosystem certificates 2310. The portal 106 then transmits the new certs 2306 and 2310 to the device 2401.

In a second subprocess 2410 portal 106 pushes the new certificates to device 2402 and completes bootstrap provisioning process 2400. Because these new certificates utilize public keys 1910 (shown in FIG. 19) that were generated during production, the corresponding private keys need never be sent over the network. Furthermore, bootstrap certificate 1906 thus serves to tie the new certificates and public keys 1910 to a specific device 2402, such that it is already known that the pre-generated certificates will correspond to the private keys in the device 2402. Bootstrap certificate 1906 and the private keys may therefore remain in the device 2402 in case of a system reset, or if either are needed for future provisioning.

Figure 25:
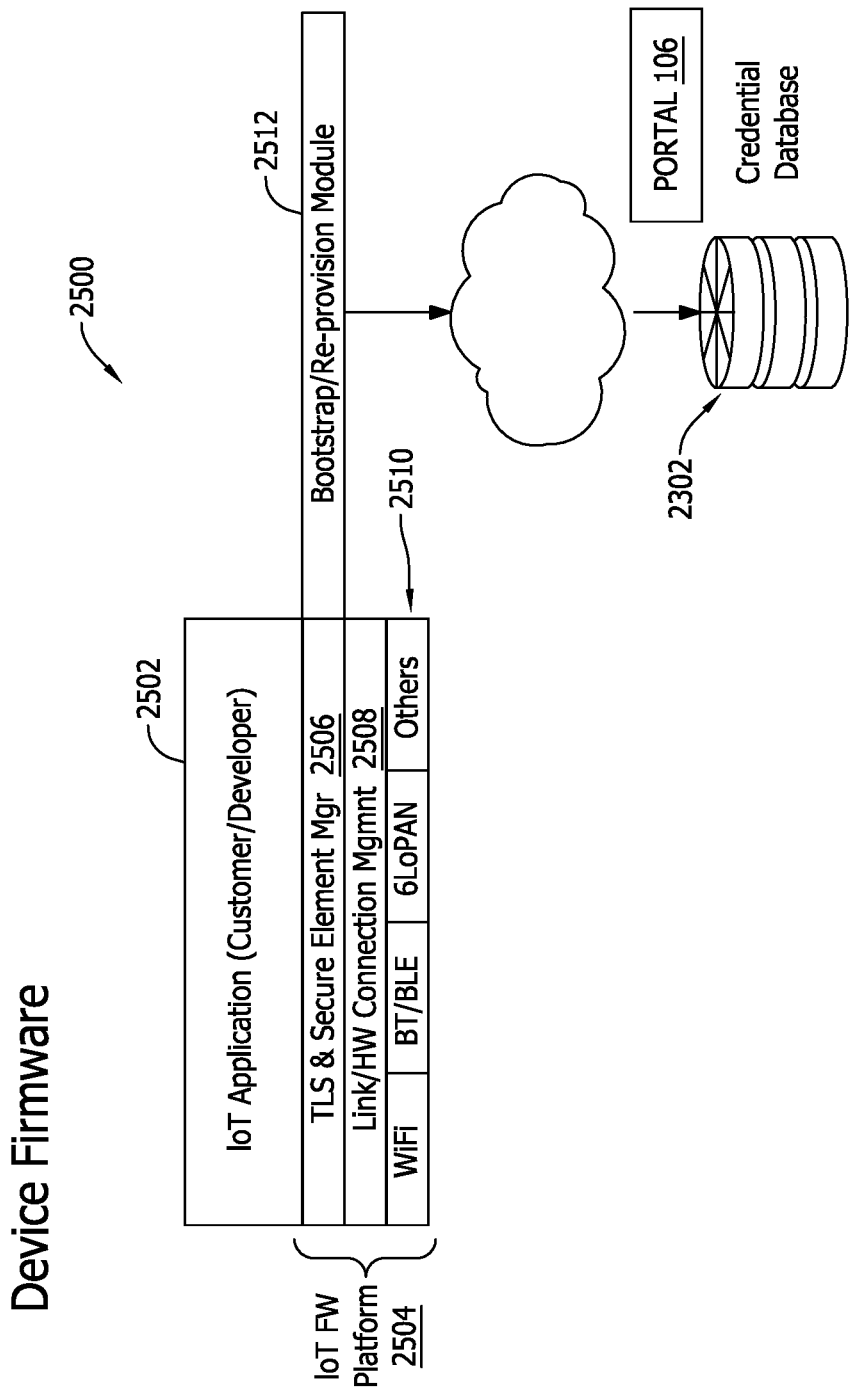
FIG. 25 is a block diagram of an Internet of Things connected device, such as the device shown in FIG. 24.

FIG. 25 is a block diagram of an Internet of Things connected device 2500, such as device 2402 (shown in FIG. 24). In the exemplary embodiment, device 2500 includes an application 2502 executing on a firmware platform 2504. The firmware platform 2504 may be broken down into multiple layers. The firmware platform 2504 may include a first layer 2506 configured to include the transport layer security and secure element manager. A second layer 2508 is configured to include link and hardware connection management. A third layer 2510 is configured to include communication protocols, such as, but not limited to, WiFi, Bluetooth/Bluetooth low energy (BT/BLE), IPv6 over low power wireless personal area network (6LoPAN), and others. The firmware platform 2504 also includes a bootstrapping/re-provisioning module 2512 capable of communicating with the credential database 2302 over the Internet or other connection.

Figure 26:
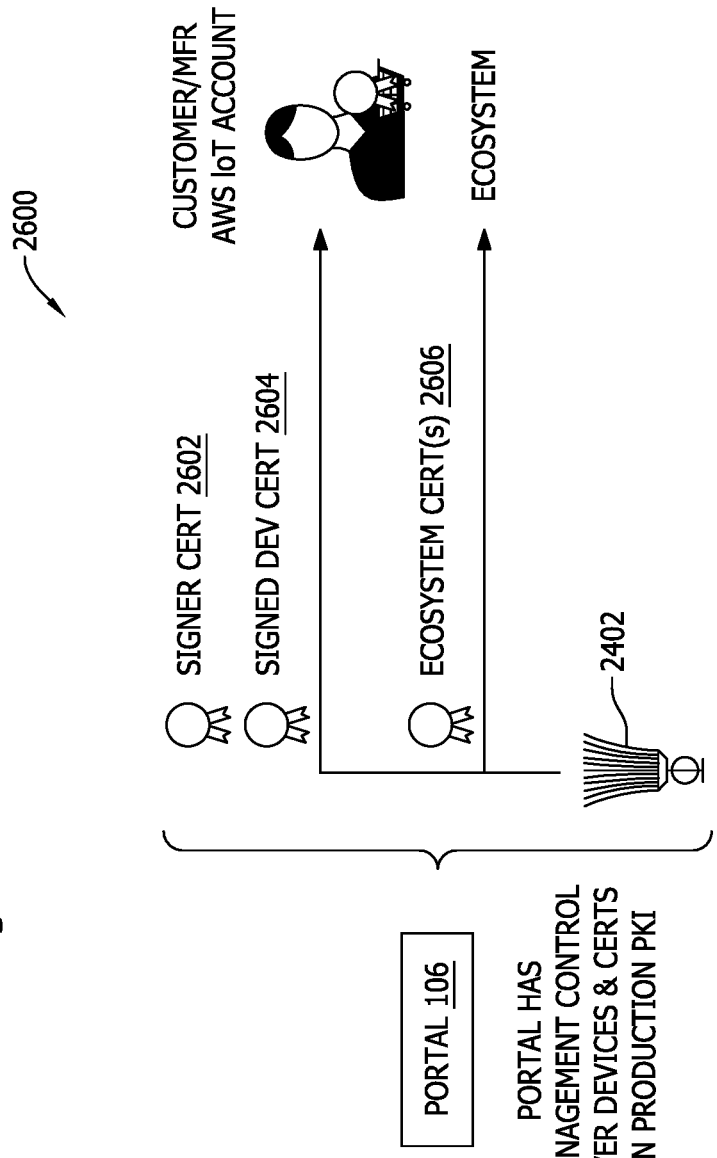
FIG. 26 is a schematic illustration of a state of a device after the provisioning process shown in FIG. 24.

FIG. 26 is a schematic illustration of a state of a device 2402 after the provisioning process 2400 (shown in FIG. 24). The portal manages the device 2402 and its corresponding certificates, including, but not limited to, signer certificate 2602, signed device certificate 2604, and ecosystem certificates 2606. The portal 106 may use the customer's AWS IoT account and CA certificate to associate the device 2402 with the manufacturer's AWS IoT account. The device certificate 2604 then authenticates to the ecosystems corresponding toe the ecosystem certificates 2606.

As shown in FIGS. 17-26, a manufacturer may manufacture 'generic' secure chips with pre-loaded bootstrap certificates, pre-generated keys, and other security without those chips being associated with a customer at the time of manufacture. Furthermore, by pre-loading this information on a portal, this allows a purchaser/user of the chips to quickly and efficiently connect their chips with their desired ecosystems. Once purchased, the purchaser/user of the chips may use the lot identifier to register the chips. Since the portal already has the certificates and key information, the portal will connect the purchased chips with the user's account and the stored certificates.

Figure 27:
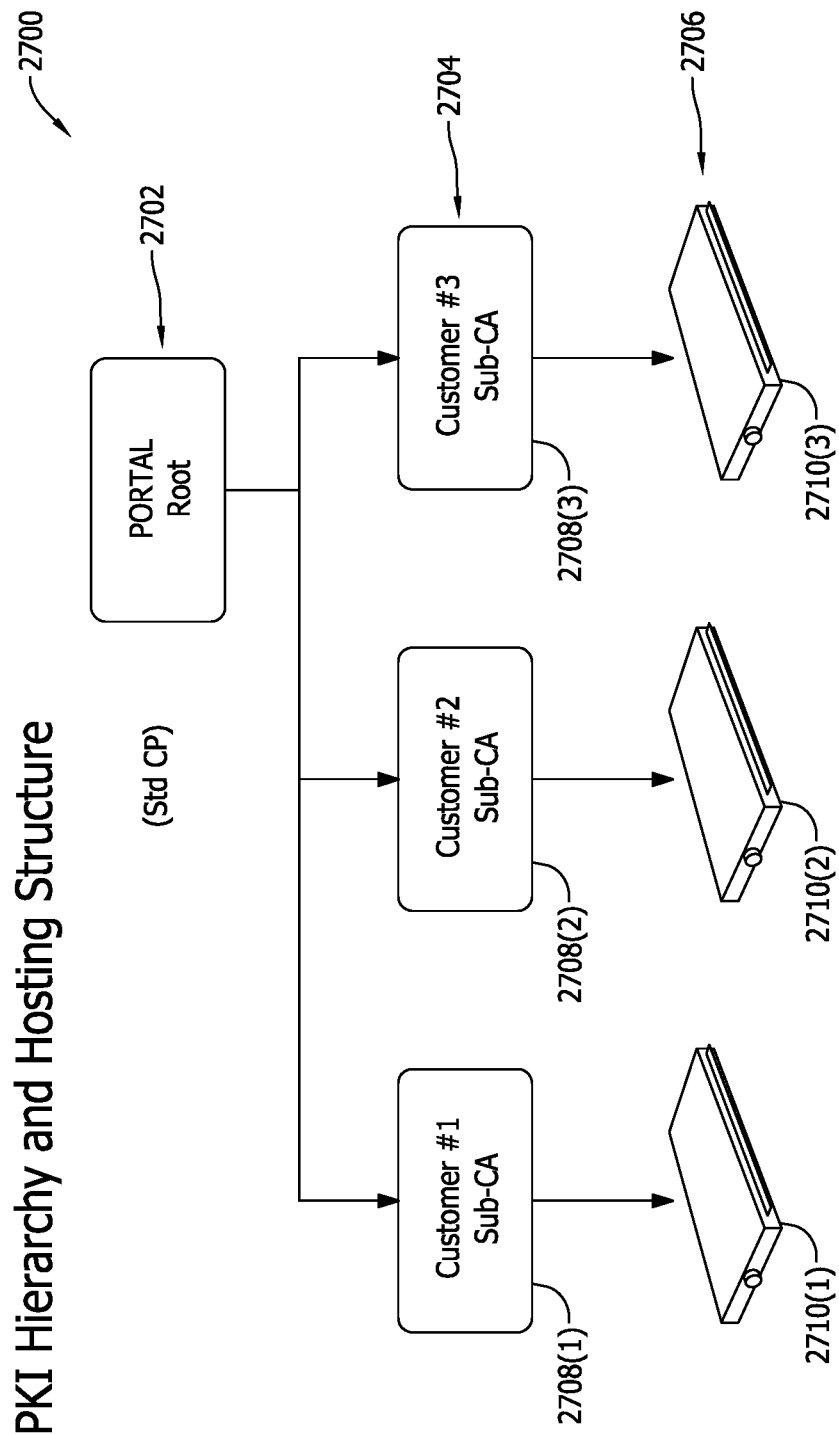
FIG. 27 is a schematic illustration of an exemplary hosting structure in accordance with the embodiments disclosed herein.

FIG. 27 is a schematic illustration of an exemplary hosting structure 2700 in accordance with the embodiments disclosed herein. Hosting structure 2700 is divided into three levels. The first level is the root 2702, which may be the secure root of trust for the certificates disclosed. The second level is the CAs 2704 for each of the customers. When a customer generates an account, then a CA 2704 (also known as a sub-CA) is generated for them. The customer's CA 2704 is associated with the parts 2706 that the customer has registered. In the exemplary embodiment, the CAs 2704 are managed by the portal 106 (shown in FIG. 1). In the exemplary embodiment, the root 2702 is managed by a separate entity from the portals.

In the exemplary embodiment, the root 2702 performs the certificate signing requests (CSR) for each of the CAs 2704. For each of the parts 2706 a CSR is issued to the portal 106 (shown in FIG. 1). The portal 106 uses the CA 2704 corresponding to the customer to sign the CSR for each part 2706.

Figure 28:
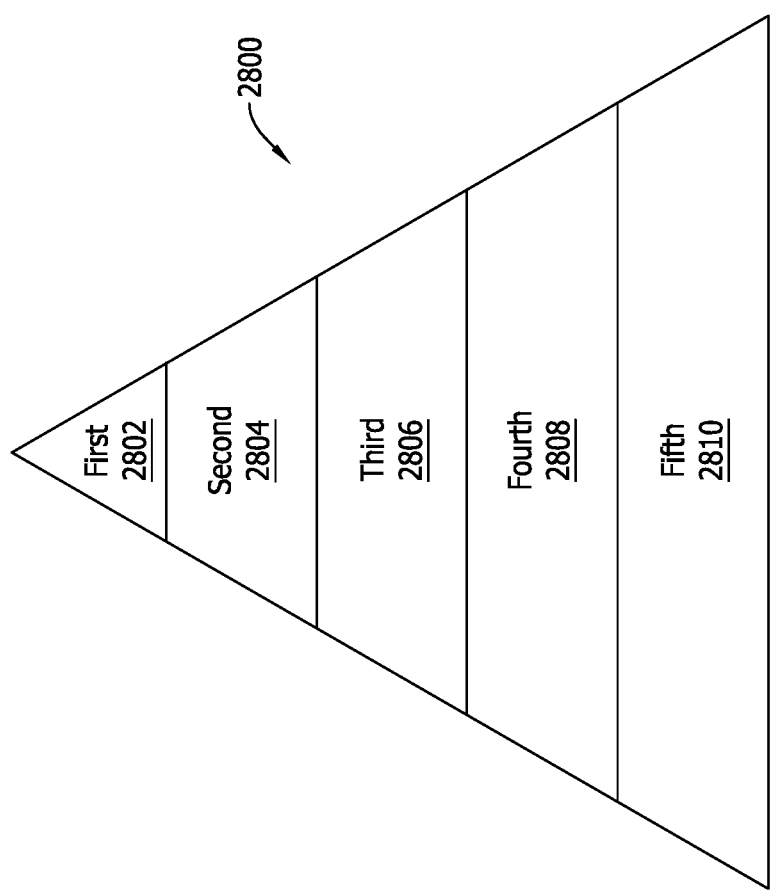
FIG. 28 illustrates a schematic diagram of a security management system with five tiers of security management that may be used with IoT devices, in accordance with the embodiments disclosed herein.

FIG. 28 illustrates a schematic diagram of a security management system 2800 with five tiers of security management that may be used with IoT devices, in accordance with the embodiments disclosed herein. The tiers of the security management system 2800 described herein are configured to provide a simple-to-integrate solution for device credentials management. The security management system 2800 provides a complete process for credentials provisioning and management through a Re-Provisioning protocol. In some embodiments, the Re-Provisioning protocol is performed by portal 106 (shown in FIG. 1) in conjunction with the manufacturer 104 (shown in FIG. 1).

The different tiers are configured to address different needs of the customers (from low cost PKI deployments to full-fledge custom PKIs). The first tier 2802 requires secure element hardware integration. The second tier 2804 does not require the secure hardware elements and includes certificates issued by the portal 106. The third tier 2806 represents a more generic PKI implementation. The fourth tier 2808 includes custom Sub-CAs for the customer. The fifth tier 2810 includes significantly more custom services for each customer/user. Each tier will be discussed more fully below.

The five tier system 2800 will allow for users to move between different tiers as the user's needs and sophistication changes. In some embodiments, the change in tier may be provided dynamically. This allows the user to start at a lower tier entry point for PKI support and work their way up as their capabilities change over time.

The first tier 2802 provides a solution that leverages the possibility of providing a portal-rooted PKI already pre-provisioned within chip secure elements. In this tier 2802, there is no revocation support, the certificates themselves are directly provisioned by the manufacturer 104, and the CAs are rooted by the portal 106. This requires the portal 106 to generate the root CA. The portal 106 also signs the SubCA's Requests for the production's line signers that sign the EE certs stored in the secure elements of the chips. However, the portal 106 does not provide additional operational support.

In the exemplary embodiment, the PKI infrastructure for the first tier 2802 includes One ECC Root CA and 128+ ECC SubCAs (manufacturer signers—not portal managed). Potentially, the PKI infrastructure can also include multiple SubCAs for other vendors or manufacturers, (not internally managed).

In this first tier 2802, the certificates will never expire. The certificates will also not be stored by the portal 106, but instead will be issued directly by the manufacturer 104.

This first tier 2802 provides a low-cost PKI entry point. The certificates are issued by the manufacturer 104.

The second tier 2804 includes some similarities to the first tier 2802, primarily that there is there is no revocation support and the CAs are rooted by the portal 106. However, there are also several differences. Primarily, the second tier 2804 does not require secure elements provided by the manufacturer 104. Furthermore, the certificates are issued by the portal 106 via a portal-owned Sub-CA.

This tier 2804 uses the Root CA from the first tier 2804. The portal 106 also generates an additional SubCA that is actively managed by the portal 106. In this tier 2804, the portal 106 supports normal PKI operations, such as, but not limited to, customer registration, certificate requests submissions, and certificates issuing, for example.

This second tier 2804 provides a convenient solution for non-sophisticated users.

The third tier 2806 provides generic PKIs including two separate PKIs that the customer can choose from with support for revocation, such as via certificate revocation lists (CRLS) and the Online Certificate Status Protocol (OCSP). The two infrastructures provide an RSA-based Root and an ECC-based Root to accommodate different security requirements. The two PKI infrastructures include one SubCA each, but with no customization about what contents go into each certificate. Customization is available at the fourth tier 2808 and above.

The third tier 2806 supports additional services, such as, integration with supported cloud providers, long-term retention of issued certificates (i.e., 10 yrs), and custom profiles for EE certificates.

The third tier 2806 includes some similarities to the second tier 2804, primarily that secure elements provided by the manufacturer 104 are not required and that the certificates are issued by the portal 106 via a portal-owned Sub-CA. The third tier 2806 is different from the second tier 2804 in that it requires an additional set of two new portal-rooted CAs and provides revocation support.

In the third tier 2806, the portal 106 generates and manages the two new PKIs. The portal 106 also supports normal PKI operations, such as, but not limited to, customer registration, certificate requests submissions, and certificates issuing, for example. The portal 106 is also responsible for the integration with Revocation Infrastructure.

The third tier 2806 also provides a convenient solution for non-sophisticated users.

The fourth tier 2808 provides the customer with the possibility to customize its own SubCA together with support for revocation (i.e., CRLs and OCSP). This tier 2808 includes customized profiles support for the SubCA Certificate, customized profiles support for EE Certificates, and the use of HSMs for SubCA Certificates.

The fourth tier 2808 supports additional services, such as enhanced support for SubCA and EE certificates profile definition, integration with cloud providers (any of the supported ones), and long-term retention of issued certificates.

The fourth tier 2808 includes some similarities to the third tier 2806, primarily that secure elements provided by the manufacturer 104 are not required, that an additional set of two new portal-rooted CAs are required, and that revocation support is provided. The fourth tier 2808 is different from the third tier 2806 in that the certificates are issued by the portal 106 under a Customer-owned SubCA.

In the third tier 2806, the portal 106 generates the Custom SubCA under the portal Generic PKI. The portal 106 also supports normal PKI operations, such as, but not limited to, customer registration, certificate requests submissions, and certificates issuing, for example. The portal 106 is also responsible for the integration with Revocation Infrastructure.

The fourth tier 2808 also provides a more advanced solution for users requiring some customization capabilities.

The fifth tier 2810 provides advanced customers with the possibility to setup a dedicated Root CA and decide about the supported hierarchy. This tier 2810 supports a Distributed Model, where the SubCAs are hosted by the Customer, and a Centralized Model where the SubCAs are hosted by the portal 106.

Furthermore, this tier 2810 provides many customization options including, but not limited to, support for revocation, support for Cloud Integration, support for Automatic Certificate Re-Provisioning (via CREPS or other supported protocols), support for long-term certificate storage, and support for web-trust compliant policy and compliance audit services.

In addition to the five tiers, customers may be able to access test PKIs. These may be integrated with the five tiers. For tiers 1 through 3, a default test PKi may be set-up. This may allow for support for custom certificate profiles, but as a separate service. For the fourth tier 2808, the test PKI may add in an additional SubCA. For the fifth tier 2810, the test PKI may provide one or more root CAs plys one or more SubCAs.

As a further explanation of the first tier 2802, it is an entry level solution with very limited operational associated costs. The first tier 2802 does not provide revocation services, is Ideal for low-cost IoT, can be used as a quick time-to-market solution for other devices (e.g., appliances), provides the possibility to switch to a managed PKI and the Re-Provisioning Protocol Implementation, and is a simple ECC P-256/SHA-256 solution.

This can leverage a collaboration between the portal owner and the manufacturer of the chips.

In one implementation, the first tier is organized into two rounds, where the first round is organized for the first ten years of operation.

In this round, the portal organizes 128 Device SubCAs, which may be configured as: (First Round)<#NUM>=<4 Digits Hex Value>. The manufacturer will host the 128 secure element keypairs on its production lines. The SubCAs will only be used to sign secure element's certificates (EE) for client TLS purposes, where this is provided by integration with the cloud providers. Furthermore, the SubCAs are signed by the Root CA. A sample signature could be ECC P-256 (prime256v1)/SHA-256; Subject: O=Portal, OU=Manufacturer, CN=PKI-Lite Tier One SubCA 01:<#NUM>; BasicConstraints: CA:TRUE, pathLen=0; Issuance Date: 20180101000000Z; and Expiration Date: 20591231000000Z. In some embodiments, these SubCAs would be valid for about 41 years. In some embodiments, the subCAs would be retired between 20290101000000Z and 20291231000000Z.

For the EE Secure Element Certificates, the key pairs would be generated within the secure elements. The certificates would be signed by the manufacturer at manufacturing time; therefore, no per-customer personalization is needed. In addition, the EE secure element certificates would be signed by the SubCA's issued for the manufacturer. This may take the format of: ECC P-256 (prime256v1)/SHA-256; Subject: O=Portal, OU=Manufacturer, CN=<MODEL><SERIAL #NUM>, Issuance Date: <Production Date> (up to 20291231000000Z); and Expiration Date: <Production Date+30 years> (up to 20591231000000Z), where the certificate is valid for around 30 years.

In the second round, which may cover the second, and last ten years of operation, the portal organizes 128 Device SubCAs, which may be configured as: (Second Round) <#NUM>=<4 Digits Hex Value>. The manufacturer will host the 128 secure element keypairs on its production lines. The SubCAs will only be used to sign secure element's certificates (EE) for client TLS purposes, where this is provided by integration with the cloud providers. Furthermore, the SubCAs are signed by the Root CA. A sample signature could be ECC P-256 (prime256v1)/SHA-256; Subject: O=Portal, OU=Manufacturer, CN=PKI-Lite Tier One SubCA 02:<#NUM>; BasicConstraints: CA:True, pathLen=0; Issuance Date: 20280101000000Z; and Expiration Date: 20691231000000Z. In some embodiments, these SubCAs would be valid for about 41 years. In some embodiments, the subCAs would not be used after 20391231000000Z.

For the EE Secure Element Certificates, the key pairs would be generated within the secure elements. The certificates would be signed by the manufacturer at manufacturing time; therefore, no per-customer personalization is needed. In addition, the EE secure element certificates would be signed by the SubCA's issued for the manufacturer. This may take the format of: ECC P-256 (prime256v1)/SHA-256; Subject: O=Portal, OU=Manufacturer, CN=<MODEL><#DEV ID>; Issuance Date: <Production Date>; Expiration Date: <Production Date+30 years>, where the certificate is valid for around 30 years.

In at least one embodiment, the root CA is a self-signed certificate with the following attributes: Subject: O=Portal, CN=PKI-Lite Tier One Root CA; Issuer: O=Portal, CN=PKI-Lite Tier One Root CA; Not Before: 20180101000000Z; and Not After: 20691231000000Z. In some embodiments, the root CA may have the following extensions: certificatePolicy: critical, <Portal. PKI-Lite. Root. 1>; keyUsage: critical, keyCertSign; basicConstraints: critical, CA:TRUE; and subjectKeyIdentifier: hash (SHA-1 over the public key).

In the round one embodiments, the SubCAs may be RootCA-Signed Certificates with the following attributes: O=Portal, OU=Manufacturer Secure Elements, CN=PKI-Lite Tier One SubCA 01:<#NUM>; #NUM=<4 Digits Hex Value>; Issuer: O=Portal, CN=PKI-Lite Tier One Root CA; Not Before: 20180101000000Z and Not After: 20591231000000Z. In some embodiments, the SubCAs may have the following extensions: certificatePolicy: critical, <Portal. Policies. PKI-Lite. 1>; keyUsage: critical, keyCertSign; basicConstraints: critical, CA:TRUE, pathLen:0; subjectKeyIdentifier: hash (SHA-1 over the public key); and authorityKeyIdentifier: keyid (Issuer's SubjectKeyIdentifier).

In the first round of embodiments, the EE Secure elements may be SubCA-Signed Certificates with the following attributes: Subject: O=Portal, OU=Manufacturer Secure Elements, CN=<MODEL><#DEV ID>, where #DEV ID=Secure Element's Serial Number; Issuer: O=Portal, OU=Manufacturer Secure Elements, CN=PKI-Lite Tier One SubCA 01:<#NUM>; Not Before: 20180101000000Z up to 20291231000000Z; and Not After: <Issuance Date>+30 years (Max Value: 20591231000000Z). In some embodiments, the EE secure elements may have the following extensions: certificatePolicy: critical, <Portal. Policies. PKI-Lite. 1>; keyUsage: critical, key Agreement, digital Signature; extendedKeyUsage: clientAuth, serverAuth, emailProtection; and authorityKeyIdentifier: keyid (Issuer's SubjectKeyIdentifier).

In the second round of embodiments, the SubCAs may be RootCA-Signed Certificates with the following attributes: Subject: O=Portal, OU=Manufacturer Secure Elements, CN=PKI-Lite Tier One SubCA 02:<#NUM>; #NUM=<4 Digits Hex Value>; Issuer: O=Portal, CN=PKI-Lite Tier One Root CA; Not Before: 20280101000000Z; and Not After: 20691231000000Z. In some embodiments, the SubCAs may have the following extensions: certificatePolicy: critical, <Portal. Policies. PKI-Lite. 1>; keyUsage: critical, keyCertSign; basicConstraints: critical, CA:TRUE, pathLen:0; subjectKeyIdentifier: hash (SHA-1 over the public key); and authorityKeyIdentifier: keyid (Issuer's Subj ectKeyIdentifier).

In the round one embodiments, the EE Secure elements may be SubCA-Signed Certificates with the following attributes: Subject: O=Portal, OU=Manufacturer Secure Elements, CN=<MODEL><#DEV ID>, where #DEV ID=Secure Element's Serial Number; Issuer: O=Portal, OU=Manufacturer Secure Elements, CN=PKI-Lite Tier One SubCA 02:<#NUM>; Not Before: 20280101000000Z up to 20391231000000Z; and Not After: <Issuance Date>+30 years (Max Value: 20691231000000Z). In some embodiments, the EE secure elements may have the following extensions: ckeyUsage: critical, keyAgreement, digitalSignature; extendedKeyUsage: clientAuth, serverAuth, emailProtection; authorityKeyIdentifier: keyid (Issuer's SubjectKeyIdentifier); and ertificatePolicy: critical, <Portal. Policies. PKI-Lite. 1>.

Figure 29:
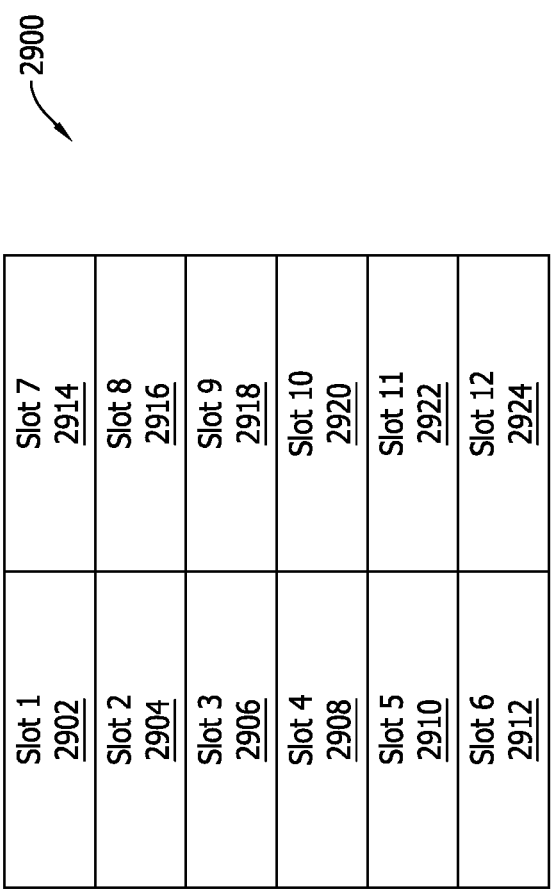
FIG. 29 illustrates an exemplary configuration for a secure element in accordance with one or more embodiments described herein.

FIG. 29 illustrates an exemplary configuration for a secure element 2900 in accordance with one or more embodiments described herein. In the exemplary embodiment, secure element 2900 includes twelve slots.

In the exemplary embodiment, the first two slots are reserved for the bootstrap credentials that are used to secure communication with the Re-Provisioning protocol. In this embodiment, slot 1 2902 contains the private key. This is permanent. The private key may be used to derive the public key. Slot 2 2904 contains the CREPS root key signing public key, which is updatable. The third slot 2906 is reserved for the private key that is used for the certificate that is issued directly by the manufacturer 104 (shown in FIG. 1) and is installed in slot 10 2920. Accordingly, slot 3 2906 includes an updatable private key, from which a public key may be derived.

In the exemplary embodiment, slots 4 through 7 are reserved for generic (application/ecosystem level) device credentials. Accordingly, slot 4 2908, slot 5 2910, slot 6 2912, and slot 7 2914 all include updateable private keys. A public key may be derived from each private key. Furthermore, the public key is stored in the CDM.

In the exemplary embodiment, slot 10 2920 is dedicated to the storage of the device certificate that is generated on the production line by the manufacturer 104. In some embodiments, this is a portal-rooted device certificate.

In the exemplary embodiment, slot 11 2922 and slot 12 2924 are dedicated to the storage of the signer's certificate (i.e, the subCA that issued the portal-rooted device certificate). Thus slot 11 2922 contains the updatable public key of the signer and slot 12 2924 includes the compressed signer's certificate.

In some embodiments, no Cloud-Integration Trust Anchors are installed on the Secure Element. This is because required TAs might change in time for a specific cloud provider, required TAs are different for each Cloud Provider, and that memory space on the Secure Element is precious. In these embodiments, customers that want Cloud Integration, will store the needed trust anchors (for server validation) within their application or firmware stack.

The present systems and methods therefore more efficiently leverage credentials that are used in secure elements, and are advantageously able to provide improved security at the message level, which greatly simplifies the requirements for devices that might not conventionally implement more expensive PKI/security protocols. The present techniques are further adaptable to additionally provide transport security for TLS-capable devices where desired. In some embodiments, the present techniques are configured to define relatively "small" sets of messages that significantly simplify the state machine for handling the credentials of the secure element(s), including without limitation, deployment, renewal, and revocation operations.

The exemplary systems and methods described and illustrated herein therefore significantly increase the commercial value of PKI implementation, and similar security measures, for technology industries and individual customers. PKI for certificates may thus be validated more efficiently. Therefore, the present embodiments operate to significantly reduce the cost of implementing PKI in a variety of technology industries, while also increasing the security of the number of integrated devices from this expanded PKI desirability. It is presently estimated, for example, that the number of IoT-connected devices is over 8 billion. The number of such deployed devices is expected to increase to over 20 billion within a few years, and to over 50 billion over the next decade. The cost savings and increased security resulting from the present embodiments is therefore considerably advantageous.

The present systems and methods are further advantageous over conventional techniques the embodiments herein are not confined to a single ecosystem, but may instead allow for versatile operation within multiple ecosystems, even in the case where each ecosystem has its own PKI. Accordingly, these novel techniques are of particular value to IoT device manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer need not be concerned of the unknown costs of a device that may be deployed within multiple ecosystems.

Exemplary embodiments of provisioning systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for provisioning, upon activation, an electronic device capable of connecting to an electronic network, the method executed through a portal in communication with a certificate authority (CA) and for a public key infrastructure (PKI) ecosystem, the method comprising the steps of:
   receiving, from the activated electronic device, a first public key of a PKI keypair stored in the electronic device;
   accessing, at a bootstrap server of the portal, a bootstrap device certificate associated with the first public key;
   performing a search operation, using the received bootstrap device certificate, for corresponding certificates stored in a credentials database of the portal;
   retrieving, based on the search operation, from the corresponding certificates in the credentials database, an ecosystem certificate associated with the PKI; and
   transmitting the retrieved ecosystem certificate to the electronic device to provision the electronic device,
   wherein the CA is associated by the portal to a particular customer after activation of the electronic device and creation of a customer account by the particular customer, and
   wherein the bootstrap device certificate is different from the retrieved account certificate and from the retrieved ecosystem certificate.

2. The method of claim 1, wherein the step of receiving comprises additionally receiving a bootstrap signer certificate associated with a manufacturer of the electronic device, wherein the bootstrap signer certificate is different from the bootstrap device certificate.

3. The method of claim 2, wherein the bootstrap signer certificate includes a second public key of the PKI different from the first public key.

4. The method of claim 3, wherein the first and second public keys are pre-generated as portions of respective first and second PKI keypairs during manufacture of the electronic device, and further comprising a step of generating the retrieved ecosystem certificate using the pre-generated first and second public keys.

5. The method of claim 1, wherein the step of retrieving comprises automatically assigning the ecosystem certificate based on a selected implementation of the electronic device upon activation.

6. The method of claim 1, wherein the step of performing comprises utilizing the received bootstrap device certificate as an index to look up one or more of a customer account association and the ecosystem certificate.

7. The method of claim 1, wherein the step of retrieving further comprises retrieval of an account certificate associated with the electronic device.

8. The method of claim 1, further comprising a step of re-provisioning the device using the bootstrap signer certificate and at least one private key stored in the electronic device during production.

9. The method of claim 8, wherein the step of re-provisioning comprises a substep of generating a new ecosystem certificate.

10. The method of claim 1, wherein the credentials database is configured for operable communication with a bootstrapping or provisioning module of the electronic device.

11. The method of claim 1, wherein the portal is further configured to manage the associated CA through a portal root.

12. The method of claim 11, wherein the portal root is configured to execute certificate signing requests for the associated CA.

13. A method for provisioning, upon activation, an electronic device capable of connecting to an electronic network, the method executed through a portal in communication with a certificate authority (CA) and for a public key infrastructure (PKI) ecosystem, the method comprising the steps of:
   receiving, from the activated electronic device, a first public key of the PKI ecosystem;
   accessing, at a bootstrap server of the portal, a bootstrap device certificate associated with the first public key;

performing a search operation, using the received bootstrap device certificate, for corresponding certificates stored in a credentials database of the portal;

retrieving, based on the search operation, from the corresponding certificates in the credentials database, an ecosystem certificate associated with the PKI; and transmitting the retrieved ecosystem certificate to the electronic device to provision the electronic device utilizing at least one push operation from the portal to the electronic device, wherein the bootstrap device certificate is different from the retrieved account certificate and from the retrieved ecosystem certificate.

14. The method of claim 13, wherein the push operation communicates the first public key and a second public key without communicating private keys corresponding to either of the first and second public keys.

15. The method of claim 13, wherein the step of retrieving further comprises retrieval of an account certificate associated with the electronic device.

* * * * *